US012786450B2

(12) United States Patent
Xu et al.

(10) Patent No.: US 12,786,450 B2
(45) Date of Patent: Nov. 3, 2026

(54) MESH DECODING DEVICE, MESH DECODING METHOD, AND PROGRAM

(71) Applicant: KDDI CORPORATION, Tokyo (JP)

(72) Inventors: Jianfeng Xu, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/059,564

(22) Filed: Feb. 21, 2025

(65) Prior Publication Data

US 2025/0193428 A1 Jun. 12, 2025

Related U.S. Application Data

(63) Continuation of application No. PCT/JP2023/029763, filed on Aug. 17, 2023.

(30) Foreign Application Priority Data

Oct. 13, 2022 (JP) ................................ 2022-165085

(51) Int. Cl.

*H04N 19/44* (2014.01)
*G06T 9/00* (2006.01)
*H04N 19/70* (2014.01)
*H04N 19/88* (2014.01)

(52) U.S. Cl.

CPC ............ *H04N 19/44* (2014.11); *G06T 9/001* (2013.01); *H04N 19/70* (2014.11); *H04N 19/88* (2014.11)

(58) Field of Classification Search

CPC ........ H04N 19/44; H04N 19/70; H04N 19/88; G06T 9/001

USPC .................................................... 375/240.25

See application file for complete search history.

(56) References Cited

U.S. PATENT DOCUMENTS

| | | | | |
|---|---|---|---|---|
| 2015/0332487 | A1 | 11/2015 | Williams et al. | |
| 2020/0211230 | A1 | 7/2020 | Zhao et al. | |
| 2020/0286261 | A1* | 9/2020 | Faramarzi | G06T 9/001 |
| 2023/0074762 | A1* | 3/2023 | Huang | G06T 17/20 |
| 2023/0090677 | A1* | 3/2023 | Zhang | G06T 9/001 382/100 |
| 2023/0177736 | A1* | 6/2023 | Zhang | G06T 9/001 |
| 2024/0048763 | A1* | 2/2024 | Tian | H04N 19/597 |
| 2024/0095965 | A1* | 3/2024 | Tian | G06T 9/001 |
| 2024/0137558 | A1* | 4/2024 | Budagavi | H04N 19/54 |
| 2024/0373063 | A1* | 11/2024 | Kim | H04N 19/70 |
| 2024/0406440 | A1* | 12/2024 | Schwarz | H04N 19/46 |
| 2025/0386050 | A1* | 12/2025 | Ilola | H04N 19/597 |

FOREIGN PATENT DOCUMENTS

| | | |
|---|---|---|
| JP | S6148072 A | 3/1986 |
| KR | 101551741 B1 | 9/2015 |

OTHER PUBLICATIONS

Japanese Office Action (and an English language translation thereof) dated Aug. 12, 2025, issued in counterpart Japanese Application No. 2022-165085.

(Continued)

*Primary Examiner* — James T Boylan

(74) *Attorney, Agent, or Firm* — Holtz, Holtz & Volek PC

(57) ABSTRACT

A mesh decoding device 200 includes a circuit that collectively sets duplicate vertices that are a plurality of vertices having identical coordinates in a decoded base mesh as a single vertex, and then rearranges the vertices in a predetermined order.

9 Claims, 33 Drawing Sheets

(56) References Cited

OTHER PUBLICATIONS

Google Draco, accessed on May 26, 2022, [Online], https://google.github.io/draco.
"CfP for Dynamic Mesh Coding", ISO/IEC JTC1/SC29/WG7 N00231, MPEG136—Online.
International Search Report (ISR) (and English language translation thereof) dated Oct. 31, 2023 issued in International Application No. PCT/JP2023/029763.
Written Opinion dated Oct. 31, 2023 issued in International Application No. PCT/JP2023/029763.

* cited by examiner

1. BASE MESH
(THE NUMBER OF VERTICES =5,THE NUMBER OF BASE FACES =4,PATCH SIZE =2)

2. SUBDIVIDED MESH

FIG. 5

| basemesh_patch_header( ) { | **Descriptor** |
|---|---|
| **mdu_face_count_minus1** | ue(v) |
| **mdu_subdivision_method_id** | ue(v) |
| **mdu_subdivision_num_method_id** | ue(v) |
| if(mdu_subdivision_num_method_id == 0){ | |
| for(i = 0; i < mdu_face_count_minus1; i++){ | |
| **mdu_subdivision_residuals** | ue(v) |
| … | |
| } | |
| } | |
| if(mdu_subdivision_num_method_id == 1){ | |
| **mdu_max_depth** | ue(v) |
| for(i = 0; i < mdu_face_count_minus1; i++){ | |
| for(j=0; j < mdu_max_depth; j++){ | |
| **mdu_subdivision_flag** | u(1) |
| } | |
| } | |
| } | |
| } | |

VERTEX B(k1) HAS THREE MOTION VECTORS

FIG. 25
SPS
DPS
DPH
ENCODED DISPLACEMENT
DPH
ENCODED DISPLACEMENT

FIG. 26

| displacement_parameter_set( ) { | Descriptor |
|---|---|
| dps_displacement_parameter_set_id | ue(v) |
| … | |
| interprediction_enabled_flag | u(1) |
| … | |
| } | |

FIG. 27

| displacement_patch_header( ) { | Descriptor |
|---|---|
| dph_displacement_parameter_set_id | ue(v) |
| ... | |
| subdivision_method_id | u(v) |
| ... | |
| patch_id | u(v) |
| ... | |
| subdivided_vertex_ids? | ue(v) |
| ... | |
| } | |

REFERENCE FRAME

| | | | | | | | | |
|---|---|---|---|---|---|---|---|---|
| FREQUENCY | f7 | f4 | f1 | f2 | f5 | f8 | f3 | f6 |
| DECODED WAVELET TRANSFORM COEFFICIENT | +19 | +17 | +8 | +2 | -1 | 0 | +1 | 0 |

FRAME TO BE DECODED

| | | | | | | | | |
|---|---|---|---|---|---|---|---|---|
| FREQUENCY | f1 | f2 | f3 | f4 | f5 | f6 | f7 | f8 |
| PREDICTED WAVELET TRANSFORM COEFFICIENT | +8 | +2 | +1 | -17 | -1 | 0 | +19 | 0 |

MESH DECODING DEVICE, MESH DECODING METHOD, AND PROGRAM

CROSS-REFERENCE TO RELATED APPLICATIONS

The present application is a continuation of PCT Application No. PCT/JP2023/029763, filed on Aug. 17, 2023, which claims the benefit of Japanese patent application No. 2022-165085 filed on Oct. 13, 2022, the entire contents of each application being incorporated herein by reference in its entirety.

TECHNICAL FIELD

The present invention relates to a mesh decoding device, a mesh decoding method, and a program.

BACKGROUND ART

Non Patent Literature 1: "Cfp for Dynamic Mesh Coding, ISO/IEC JTC1/SC29/WG7 N00231, MPEG136—Online" discloses a technology for encoding a mesh using Non Patent Literature 2: "Google Draco, accessed on May 26, 2022, [Online], https://google.github.io/draco".

SUMMARY OF THE INVENTION

However, in the related art, since the coordinates and connectivity information of all the vertices included in the dynamic mesh are losslessly encoded, there is a problem that the amount of information cannot be reduced even under a condition where loss is allowed, and encoding efficiency is low. Therefore, the present invention has been made in view of the above-described problems, and an object of the present invention is to provide a mesh decoding device, a mesh encoding device, a mesh decoding method, and a program capable of improving mesh encoding efficiency.

In the related art, there is a problem that the motion vector encoding efficiency is low due to duplicate vertices existing in the decoded base mesh. Therefore, the present invention has been made in view of the above-described problems, and an object of the present invention is to provide a mesh decoding device, a mesh encoding device, a mesh decoding method, and a program capable of improving mesh encoding efficiency.

The first aspect of the present invention is summarized as a mesh decoding device including: a circuit that collectively sets duplicate vertices that are a plurality of vertices having identical coordinates in a decoded base mesh as a single vertex, and then rearranges the vertices in a predetermined order.

The second aspect of the present invention is summarized as a mesh decoding method including: collectively setting duplicate vertices that are a plurality of vertices having identical coordinates in a decoded base mesh as a single vertex, and then rearranging the vertices in a predetermined order.

The third aspect of the present invention is summarized as a program for causing a computer to function as a mesh decoding device, wherein the mesh decoding device includes a circuit that collectively sets duplicate vertices that are a plurality of vertices having identical coordinates in a decoded base mesh as a single vertex, and then rearranges the vertices in a predetermined order.

According to the present invention, it is possible to provide a mesh decoding device, a mesh encoding device, a mesh decoding method, and a program capable of improving mesh encoding efficiency.

BRIEF DESCRIPTION OF THE DRAWINGS

FIG. 5 is a diagram illustrating an example of a syntax configuration of a base patch header (BPH).

FIG. 26 is a diagram illustrating an example of a syntax configuration of a DPS.

FIG. 27 is a diagram illustrating an example of a syntax configuration of a DPH.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Hereinafter, a mesh processing system according to the present embodiment will be described with reference to FIGS. 1 to 31.

Figure 1:
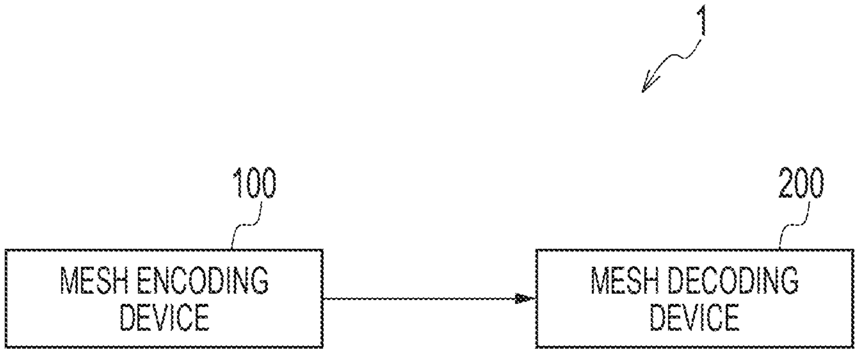
FIG. 1 is a diagram illustrating an example of a configuration of a mesh processing system 1 according to an embodiment.

FIG. 1 is a diagram illustrating an example of a configuration of a mesh processing system 1 according to the present embodiment. As illustrated in FIG. 1, the mesh processing system 1 includes a mesh encoding device 100 and a mesh decoding device 200.

Figure 2:
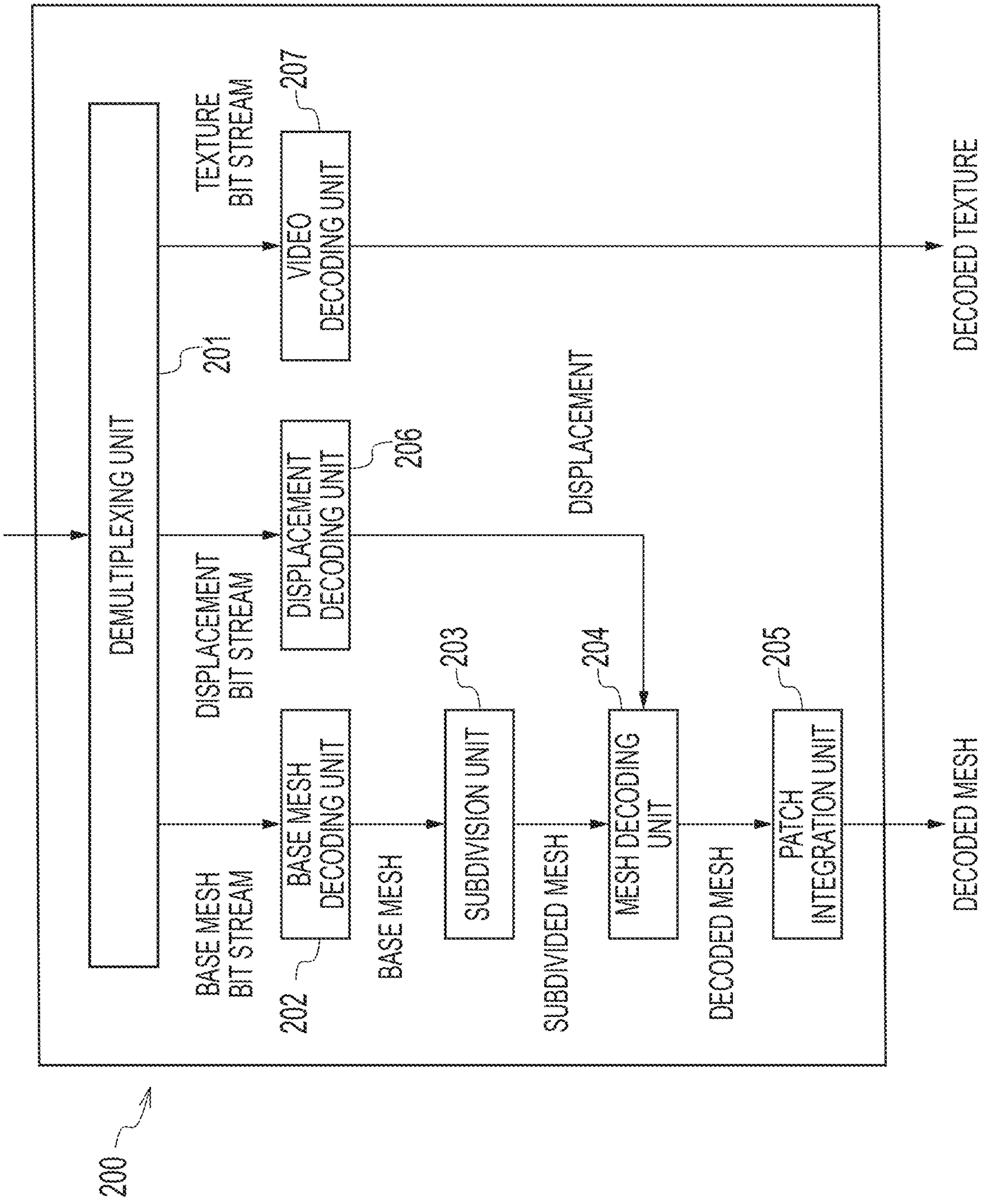
FIG. 2 is a diagram illustrating an example of functional blocks of a mesh decoding device 200 according to an embodiment.

FIG. 2 is a diagram illustrating an example of functional blocks of the mesh decoding device 200 according to the present embodiment.

As illustrated in FIG. 2, the mesh decoding device 200 includes a demultiplexing unit 201, a base mesh decoding unit 202, a subdivision unit 203, a mesh decoding unit 204, a patch integration unit 205, a displacement decoding unit 206, and a video decoding unit 207.

Here, the base mesh decoding unit 202, the subdivision unit 203, the mesh decoding unit 204, and the displacement decoding unit 206 may be configured to perform processing in units of patches obtained by dividing a mesh, and the patch integration unit 205 may be configured to integrate the processing results thereafter.

Figure 3A:
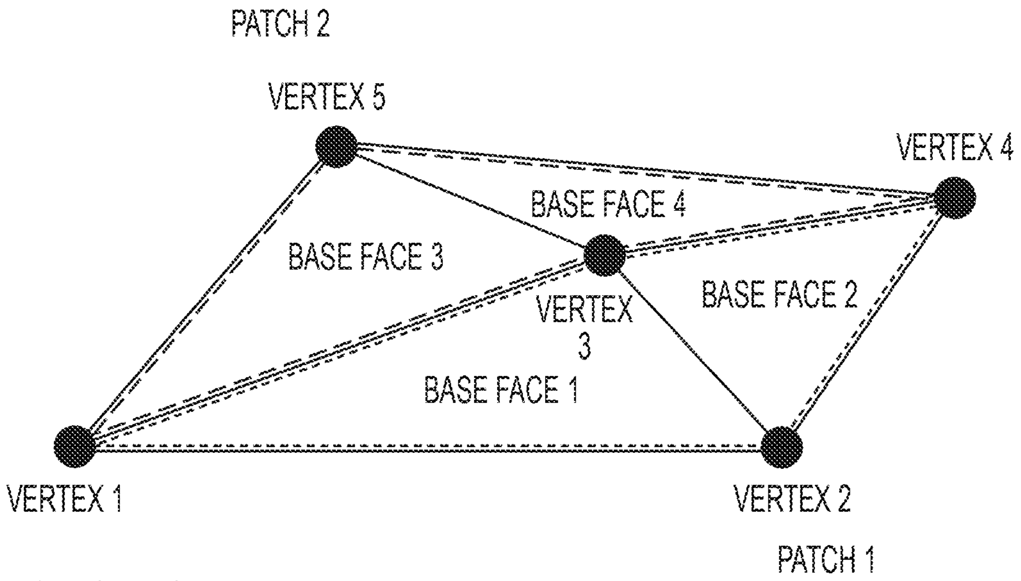
FIG. 3A is a diagram illustrating an example of a base mesh and a subdivided mesh.

In the example of FIG. 3A, the mesh is divided into a patch 1 having base faces 1 and 2 and a patch 2 having base faces 3 and 4.

The demultiplexing unit 201 is configured to separate a multiplexed bit stream into a base mesh bit stream, a displacement bit stream, and a texture bit stream.

<Base Mesh Decoding Unit 202>

The base mesh decoding unit 202 is configured to decode the base mesh bit stream, and generate and output a base mesh.

Here, the base mesh includes a plurality of vertices in a three-dimensional space and edges connecting the plurality of vertices.

As illustrated in FIG. 3A, the base mesh is configured by combining base faces expressed by three vertices.

The base mesh decoding unit 202 may be configured to decode the base mesh bit stream by using, for example, Draco described in Non Patent Literature 2.

Furthermore, the base mesh decoding unit 202 may be configured to generate "subdivision_method_id" described below as control information for controlling a type of a subdivision method.

Hereinafter, the control information decoded by the base mesh decoding unit 202 will be described with reference to FIGS. 4 and 5.

Figure 4:
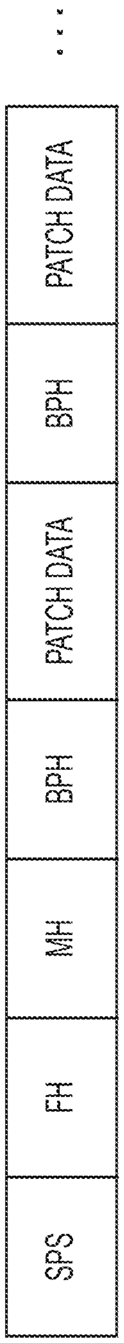
FIG. 4 is a diagram illustrating an example of a syntax configuration of a base mesh bit stream.

FIG. 4 is a diagram illustrating an example of a syntax configuration of the base mesh bit stream.

As illustrated in FIG. 4, firstly, the base mesh bit stream may include a base patch header (BPH) that is a set of control information corresponding to a base mesh patch. Second, the base mesh bit stream may include base mesh patch data obtained by encoding the base mesh patch next to the BPH.

As described above, the base mesh bit stream has a configuration in which the BPH corresponds to each patch data one by one. Note that the configuration of FIG. 4 is merely an example, and elements other than those described above may be added as constituent elements of the base mesh bit stream as long as the BPH corresponds to each patch data.

For example, as illustrated in FIG. 4, the base mesh bit stream may include a sequence parameter set (SPS), may include a frame header (FH) which is a set of control information corresponding to a frame, or may include a mesh header (MH) which is control information corresponding to the mesh.

FIG. 5 is a diagram illustrating an example of a syntax configuration of the BPH. Here, if syntax functions are similar, syntax names different from those illustrated in FIG. 5 may be used.

In the syntax configuration of the BPH illustrated in FIG. 5, a Description column indicates how each syntax is encoded. Further, ue(v) means an unsigned 0-order exponential-Golomb code, and u(n) means an n-bit flag.

The BPH includes at least a control signal (mdu_face_count_minus1) that designates the number of base faces included in the base mesh patch.

Further, the BPH includes at least a control signal (mdu_subdivision_method_id) that designates the type of the subdivision method of the base mesh for each base patch.

In addition, the BPH may include a control signal (mdu_subdivision_num_method_id) that designates a type of a subdivision number generation method for each base mesh patch. For example, when mdu_subdivision_num_method_id=0, it may be defined that the number of subdivisions of the base face is generated by a prediction division residual, when mdu_subdivision_num_method_id=1, it may be defined that the number of subdivisions of the base face is recursively generated, and when mdu_subdivision_num_method_id=2, it may be defined that the same upper limit number of times of subdivision is recursively performed for all the base faces.

The BPH may include a control signal (mdu_subdivision_resuiduals) that designates the prediction division residual of the base face for each index i (i=0, . . . , and mdu_face_count_minus1) when the number of subdivisions of the base face is generated by the prediction division residual.

The BPH may include a control signal (mdu_max_depth) for identifying an upper limit of the number of times of subdivision recursively performed for each base mesh patch when the number of subdivisions of the base face is recursively generated.

The BPH may include a control signal (mdu_subdivision_flag) that designates whether or not to recursively subdivide the base face for each of the indices i (i=0, . . . , and mdu_face_count_minus1) and j (j=0, . . . , and mdu_subdivision_depth_index).

Figure 6:
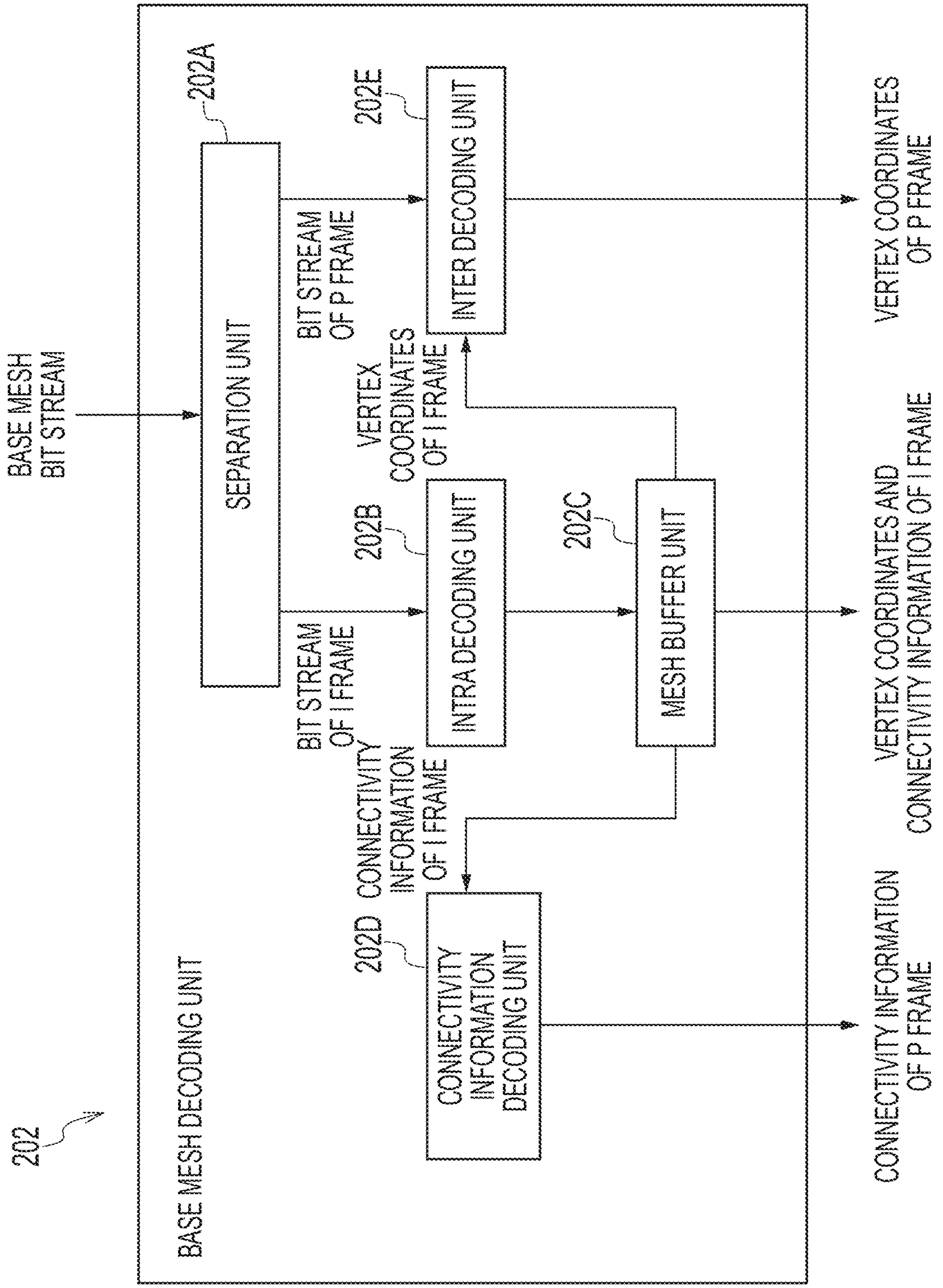
FIG. 6 is a diagram illustrating an example of functional blocks of a base mesh decoding unit 202 of the mesh decoding device 200 according to an embodiment.

As illustrated in FIG. 6, the base mesh decoding unit 202 includes a separation unit 202A, an intra decoding unit 202B, a mesh buffer unit 202C, a connectivity information decoding unit 202D, and an inter decoding unit 202E.

The separation unit 202A is configured to classify the base mesh bit stream into an I-frame (reference frame) bit stream and a P-frame bit stream.

(Intra Decoding Unit 202B)

The intra decoding unit 202B is configured to decode coordinates and connectivity information of vertices of an I frame from the I-frame bit stream using, for example, Draco described in Non Patent Literature 2.

Figure 7:
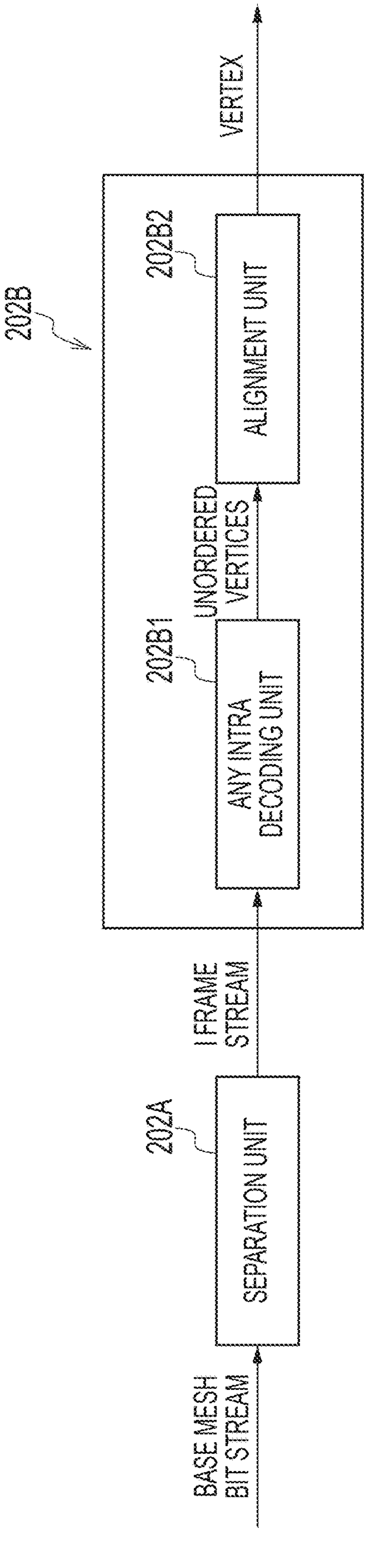
FIG. 7 is a diagram illustrating an example of functional blocks of an intra decoding unit 202B of the base mesh decoding unit 202 of the mesh decoding device 200 according to an embodiment.

FIG. 7 is a diagram illustrating an example of functional blocks of the intra decoding unit 202B.

As illustrated in FIG. 7, the intra decoding unit 202B includes an any intra decoding unit 202B1 and an alignment unit 202B2.

The any intra decoding unit 202B1 is configured to decode the coordinates and the connectivity information of the unordered vertex of the I frame from the bit stream of the I frame using an any method including Draco described in Non Patent Literature 2.

The alignment unit 202B2 is configured to output the vertices by rearranging the unordered vertices in a predetermined order.

As the predetermined order, for example, a Morton code order may be used, or a raster scan order may be used.

Furthermore, the alignment unit 202B2 may collectively set duplicate vertices that are a plurality of vertices having identical coordinates in the decoded base mesh as a single vertex, and then rearranges the vertices in a predetermined order.

Here, an example of the operation of the arrangement unit 202B2 will be described with reference to FIG. 8.

Figure 8:
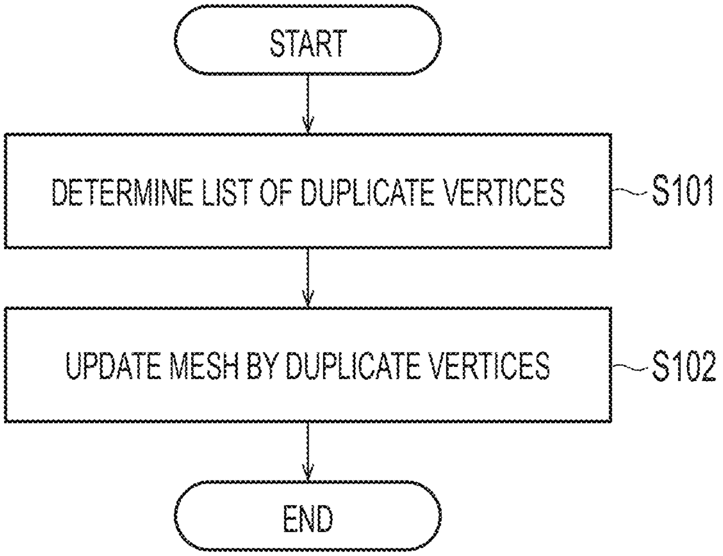
FIG. 8 is a flowchart illustrating an example of an operation of the arrangement unit 202B2 of the intra decoding unit 202B of the base mesh decoding unit 202 of the mesh decoding device 200 according to an embodiment.

As illustrated in FIG. 8, in step S101, the arrangement unit 202B2 determines the above-described list of duplicate vertices. That is, the arrangement unit 202B2 determines a list of the duplicate vertices existing in the decoded base mesh. Here, at least two methods are assumed as a method of determining the list of duplicate vertices.

(Determination Method 1)

For example, in the determination method 1, the arrangement unit 202B2 is configured to decode the above-described list of duplicate vertices from the bit stream of the I frame.

Specifically, first, the arrangement unit 202B2 decodes a flag indicating the presence or absence of duplicate vertices from the bit stream of the I frame.

Second, if such a flag is TRUE, the arrangement unit 202B2 decodes the number D of duplicate vertices.

Third, the arrangement unit 202B2 decodes pairs of the indexes A(k) and the indexes B(k) of vertices existing as duplicate vertices one by one from the bit stream of the I frame and stores the decoded pairs in the specific buffer. Where, A(k), B(k), and k (k=1, 2, . . . , D) are integers. Here, the list of such pairs is stored in the specific buffer in the order of A(k)→B(k).

When the flag is FALSE, the arrangement unit 202B2 empties the specific buffer.

According to the determination method 1, since the calculation is not executed, an effect that an increase in the calculation amount can be avoided can be expected.

(Determination Method 2)

The arrangement unit 202B2 is configured to calculate a list of the duplicate vertices by searching for duplicate vertices in the decoded base mesh in the determination method 2.

Specifically, first, the arrangement unit 202B2 searches for an index of a vertex (duplicate vertices) whose coordinates match from the geometric information of the decoded base mesh, and stores the index in the buffer.

Note that the input to the arrangement unit 202B2 is an index (decoding order) and position coordinates of each vertex of the decoded base mesh, and the output from the arrangement unit 202B2 is a list of pairs of the indexes A(k) and the indexes B(k) of vertices existing as duplicate vertices. Where, A(k), B(k), and k (k=1, 2, . . . , D) are integers. Here, the list of such pairs is stored in the specific buffer in the order of A(k)→B(k).

In addition, the arrangement unit 202B2 empties the specific buffer when there is no vertex whose coordinates match in the search described above (that is, D=0).

According to the determination method 2, since data is not taken from the bit stream, an effect that an increase in the bit rate can be avoided can be expected.

In both cases of the determination method 1 and the determination method 2, since B(k) is decoded before A(k), the relationship of A(k)>B(k) is established.

In step S102, the arrangement unit 202B2 updates the mesh based on the duplicate vertices.

Figure 9:
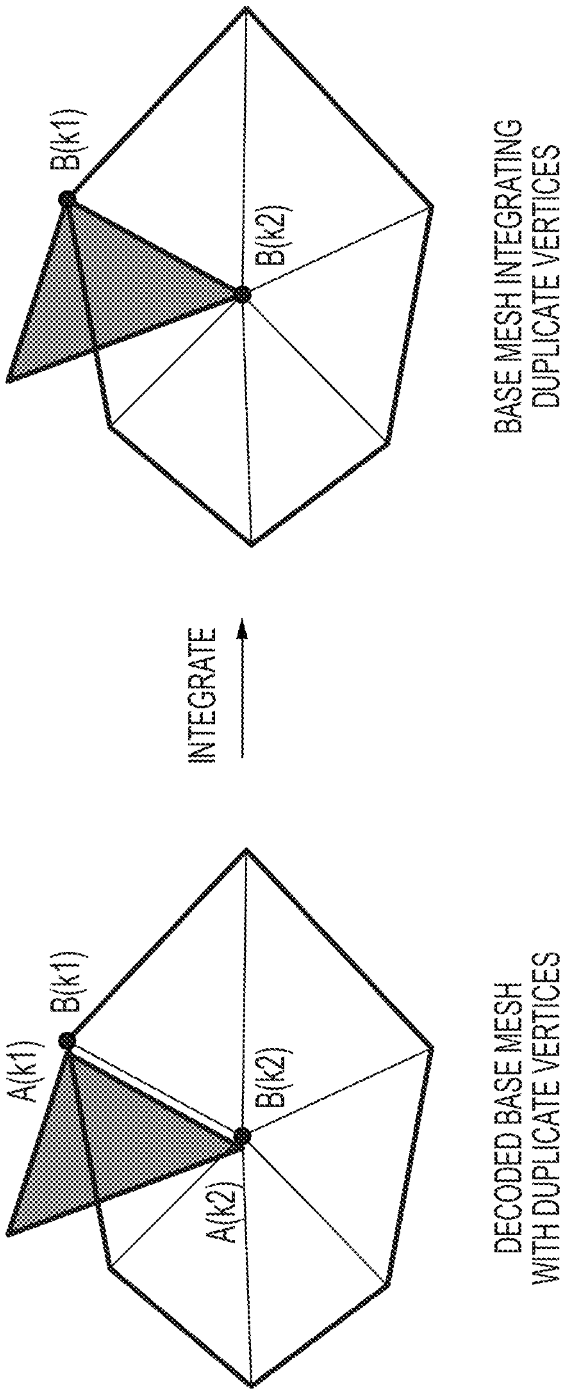
FIG. 9 is a diagram for describing an example of an operation of the arrangement unit 202B2 of the intra decoding unit 202B of the base mesh decoding unit 202 of the mesh decoding device 200 according to an embodiment.

After determining the list of duplicate vertices in step S101, the arrangement unit 202B2 integrates all or some of the duplicate vertices to update Connectivity as illustrated in FIG. 9.

At least two methods are assumed as a method of implementing the operation of updating Connectivity.

(Implementation Method 1)

For example, in the implementation method 1, the arrangement unit 202B2 processes all the duplicate vertices stored in the specific buffer in step S101 described above.

Specifically, in the implementation method 1, first, the arrangement unit 202B2 deletes D vertices of A(k) (k=1, 2, . . . , D) from the set of vertices of the base mesh.

Second, the arrangement unit 202B2 sequentially switches the index of the vertex A(k) to B(k) in Connectivity. However, when there is an index of UV coordinates in Connectivity, the arrangement unit 202B2 may not change the index.

Third, the arrangement unit 202B2 resets the index so as to eliminate the discontinuous index. For example, the arrangement unit 202B2 moves up all the indexes after the deleted A(k) by one. The arrangement unit 202B2 repeats such a moving up operation until k=1 to D.

In implementation method 1, although the number of vertices is reduced, the number of faces and the number of UV coordinates may not be changed.

(Implementation Method 2)

In the implementation method 2, the arrangement unit 202B2 decodes, from the bit stream, information related to duplicate vertices not to be processed (vertices that do not need to be processed) among the duplicate vertices stored in the specific buffer in step S101 described above, and integrates duplicate vertices other than the duplicate vertices not to be processed to update Connectivity.

Specifically, in the implementation method 2, first, the arrangement unit 202B2 decodes a flag indicating the presence or absence of a vertex (duplicate vertices) that is not processed from the bit stream.

Second, if such a flag is TRUE, the arrangement unit 202B2 decodes the number N of vertices that do not need to be processed.

Third, the arrangement unit 202B2 decodes the index A(k) of the vertex that does not need to be processed or the order k of the index A(k) one by one. k=1, 2, . . . , N.

Fourth, the arrangement unit 202B2 deletes the pair including A(k) or the k-th pair from the pairs of duplicate vertices stored in the specific buffer in step S101 described above.

Fifth, the arrangement unit 202B2 performs the above-described implementation method 1 using the last updated specific buffer.

In the implementation method 2, although the number of vertices is reduced, the number of faces and the number of UV coordinates may not be changed.

The mesh buffer unit 202C is configured to accumulate coordinates and connectivity information of vertices of the I frame decoded by the intra decoding unit 202B. Here, a specific buffer that stores a pair of indexes A(k) and B(k) of vertices existing as duplicate vertices in a predetermined order may be provided.

The connectivity information decoding unit 202D is configured to set the connectivity information of the I frame extracted from mesh buffer unit 202C as the connectivity information of the P frame.

The inter decoding unit 202E is configured to decode the coordinates of the vertices of the P frame by adding the coordinates of the vertices of the I frame extracted from the mesh buffer unit 202C and the motion vector decoded from the bit stream of the P frame.

Furthermore, the inter decoding unit 202E can adjust the index of the vertex of the P frame by the pair of indices A(k) and B(k) of the vertices existing as the duplicate vertices stored in the specific buffer.

Figure 10:
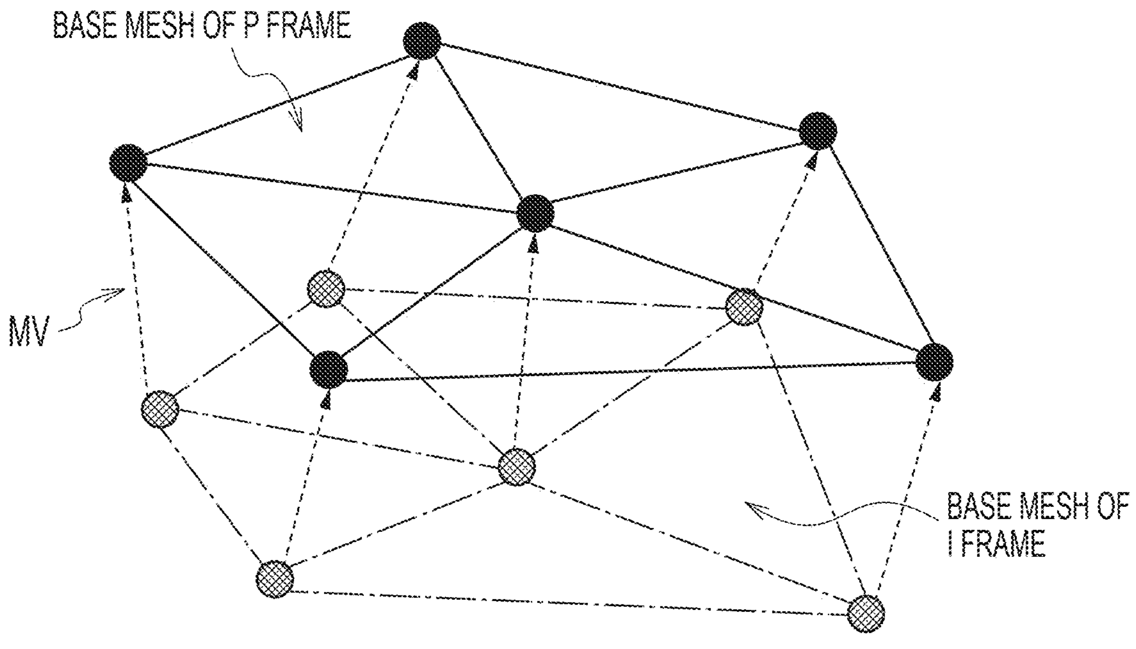
FIG. 10 is a diagram illustrating an example of a correspondence between vertices of a base mesh of a P frame and vertices of a base mesh of an I frame.

In the present embodiment, as illustrated in FIG. 10, there is a correspondence between the vertices of the base mesh of the P frame and the vertices of the base mesh of the I frame (reference frame). Here, the motion vector decoded by the inter decoding unit 202E is a difference vector between the coordinates of the vertex of the base mesh of the P frame and the coordinates of the vertex of the base mesh of the I frame.

As described later, the inter decoding unit 202E may be configured to calculate an index or a coordinate of a vertex to be increased in the base mesh of the inter frame to be decoded by the vertex of the base mesh of the reference frame having the plurality of motion vectors.

(Inter Decoding Unit 202E)

Figure 11:
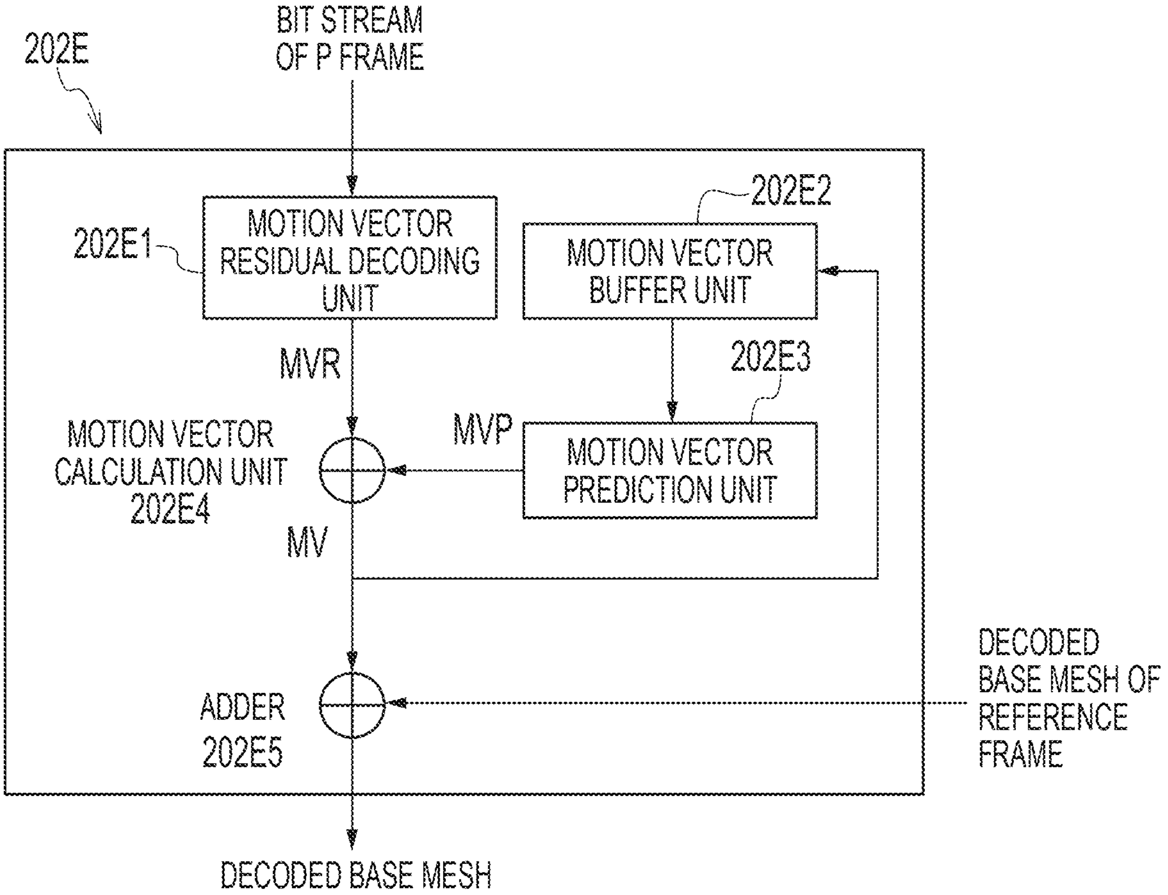
FIG. 11 is a diagram illustrating an example of functional blocks of an inter decoding unit 202E of the base mesh decoding unit 202 of the mesh decoding device 200 according to an embodiment.

FIG. 11 is a diagram illustrating an example of functional blocks of the inter decoding unit 202E.

As illustrated in FIG. 11, the inter decoding unit 202E includes a motion vector residual decoding unit 202E1, a motion vector buffer unit 202E2, a motion vector prediction unit 202E3, a motion vector calculation unit 202E4, and an adder 202E5.

Figure 12:
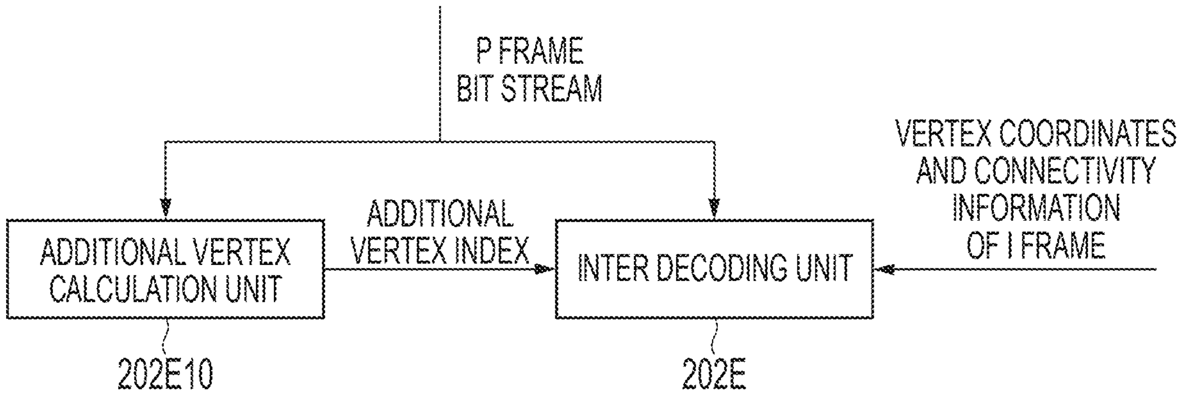
FIG. 12 is a diagram illustrating an example of functional blocks of a base mesh decoding unit 202 of the mesh decoding device 200 according to an embodiment.

Further, when the arrangement unit 202B2 implements the implementation method 1 (that is, in a case where all duplicate vertices are integrated), as illustrated in FIG. 12, the base mesh decoding unit 202 may include an additional vertex calculation unit 202E10 before the inter decoding unit 202E.

Here, the additional vertex calculation unit 202E10 is configured to calculate an index of a vertex to be increased in the base mesh of the inter frame to be decoded by the vertex of the base mesh of the reference frame having the plurality of motion vectors.

Figure 13:
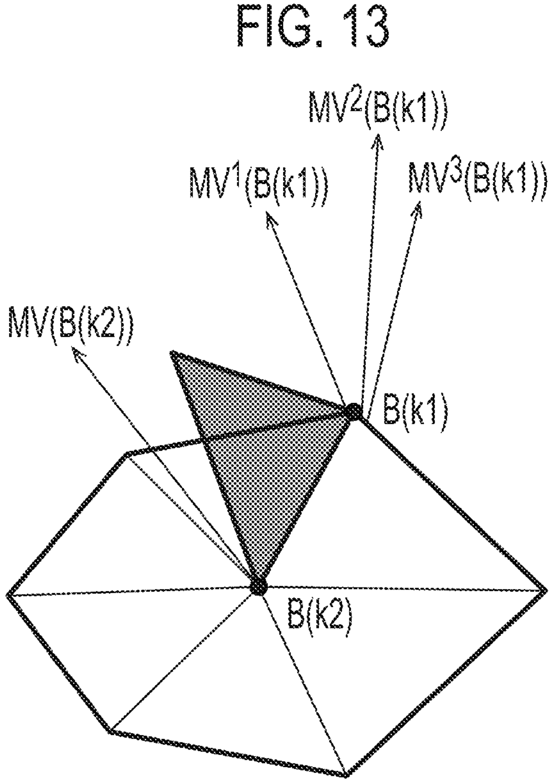
FIG. 13 is a view illustrating vertices of a base mesh of a reference frame having a plurality of motion vectors.

In addition, FIG. 13 illustrates vertices of a base mesh of a reference frame having the plurality of motion vectors described above.

The additional vertex calculation unit 202E10 decodes, from the bit stream, an index of a vertex to be increased in the base mesh of the inter frame to be decoded by the vertex of the base mesh of the reference frame having the plurality of motion vectors.

First, the additional vertex calculation unit 202E10 decodes, from the bit stream, a flag indicating the presence or absence of a vertex of a base mesh of a reference frame having a plurality of motion vectors that do not need to be processed.

Second, when such a flag is TRUE, the additional vertex calculation unit 202E10 decodes the number N of vertices to be increased in the base mesh of the inter frame to be decoded by the vertex of the base mesh of the reference frame having a plurality of motion vectors and not need to be processed.

That is, the additional vertex calculation unit 202E10 increases one vertex in the base mesh of the inter frame to be decoded by the vertex of the base mesh of the reference frame having two motion vectors, and increases two vertices in the base mesh of the inter frame to be decoded by the vertex of the base mesh of the reference frame having three motion vectors.

Third, the additional vertex calculation unit 202E10 decodes a pair of the index A(k) of the vertex to be increased in the base mesh of the inter frame to be decoded and the index B(k) of the vertex of the base mesh of the corresponding reference frame that does not need to be processed or the order k of the index B(k) one by one, and stores the pair in the specific buffer described above. k=1, 2, . . . , N.

When the flag indicating the presence or absence of the vertex of the base mesh of the reference frame having the plurality of motion vectors is FALSE, the additional vertex calculation unit 202E10 empties the specific buffer.

Furthermore, the additional vertex calculation unit 202E10 deletes the pair including A(k) or the k-th pair among the pairs of duplicate vertices stored in the specific buffer in step S101 described above.

The motion vector residual decoding unit 202E1 is configured to generate a motion vector residual (MVR) from a P frame bit stream.

Here, the MVR is a motion vector residual indicating a difference between a motion vector (MV) and a motion vector prediction (MVP). The MV is a difference vector (motion vector) between the coordinates of the vertex of the corresponding I frame and the coordinates of the vertex of the P frame. The MVP is a predicted value of the MV of a target vertex using the MV (a predicted value of a motion vector).

The motion vector buffer unit 202E2 is configured to sequentially store the MVs output by the motion vector calculation unit 202E4.

Figure 14:
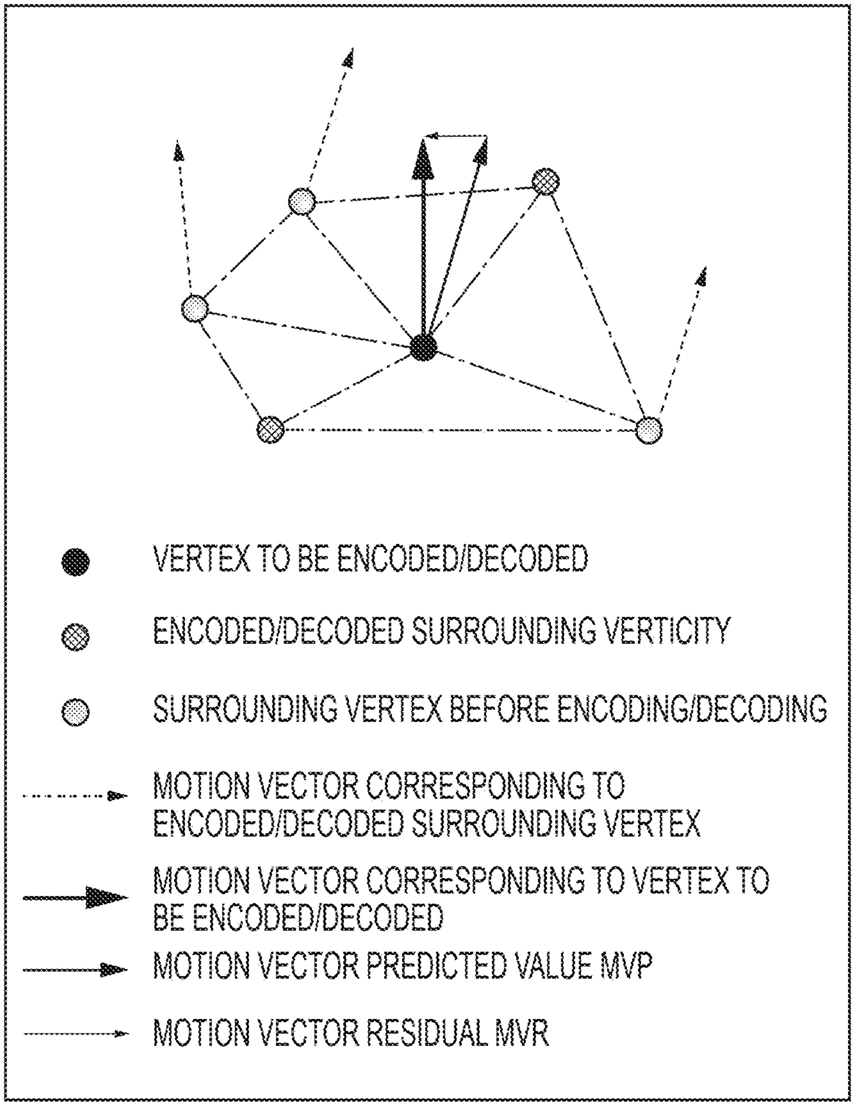
FIG. 14 is a diagram for describing an example of a method of calculating an MVP of a vertex to be decoded by a motion vector prediction unit 202E3 of the inter decoding unit 202E of the base mesh decoding unit 202 of the mesh decoding device 200 according to an embodiment.

The motion vector prediction unit 202E3 is configured to acquire the decoded MV from the motion vector buffer unit 202E2 for the vertex connected to the vertex to be decoded, and output the MVP of the vertex to be decoded using all or some of the acquired decoded MVs as illustrated in FIG. 14.

The motion vector calculation unit 202E4 is configured to add the MVR generated by the motion vector residual decoding unit 202E1 and the MVP output from the motion vector prediction unit 202E3, and output the MV of the vertex to be decoded.

The adder 202E5 is configured to add the coordinates of the vertex corresponding to the vertex to be decoded obtained from the decoded base mesh of the I frame (reference frame) having the correspondence and the motion vector MV output from the motion vector calculation unit 202E3, and output the coordinates of the vertex to be decoded.

Details of each unit of the inter decoding unit 202E will be described below.

Figure 15:
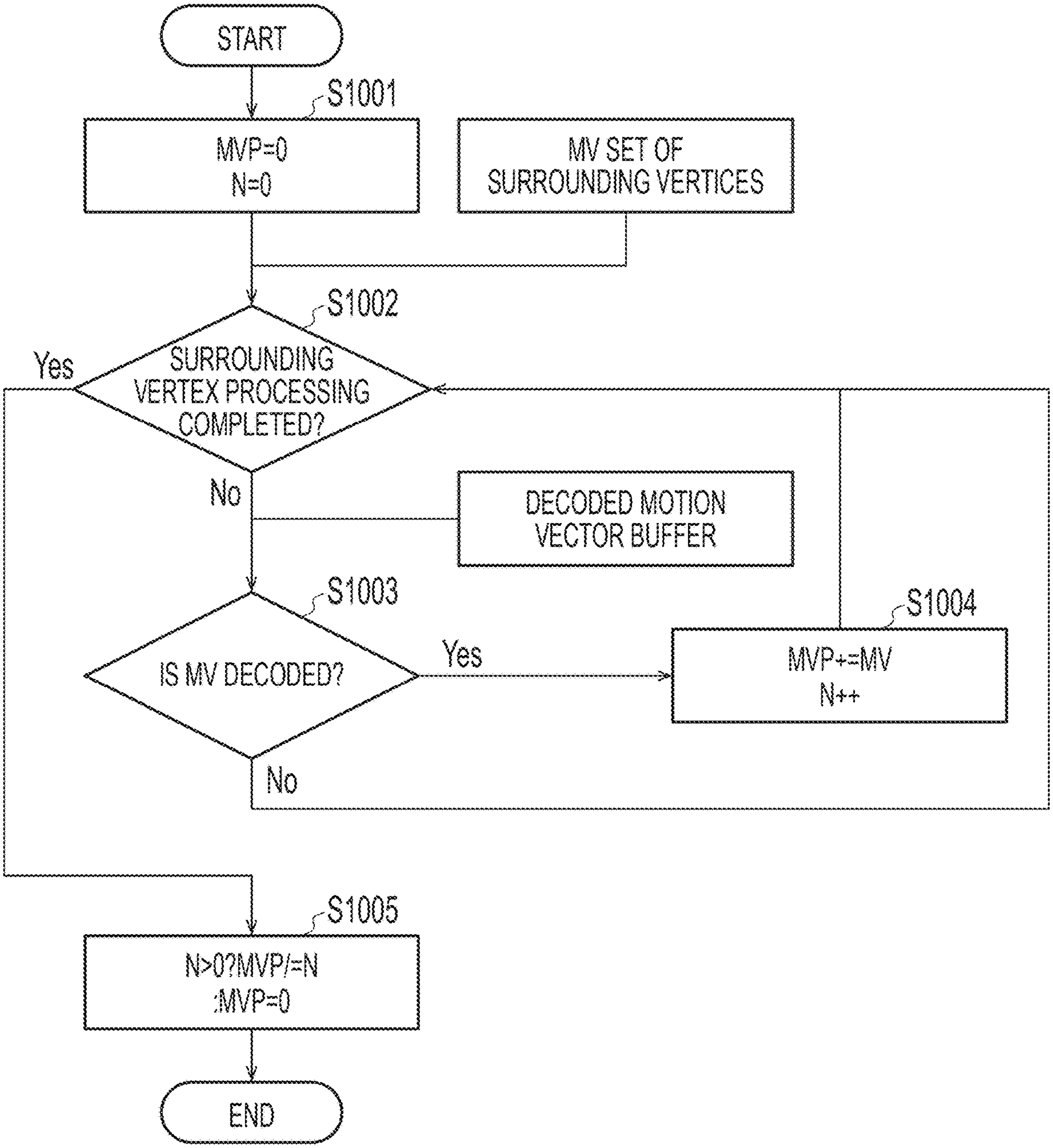
FIG. 15 is a flowchart illustrating an example of an operation of the motion vector prediction unit 202E3 of the inter decoding unit 202E of the base mesh decoding unit 202 of the mesh decoding device 200 according to an embodiment.

FIG. 15 is a flowchart illustrating an example of the operation of the motion vector prediction unit 202E3.

As illustrated in FIG. 15, in step S1001, the motion vector prediction unit 202E3 sets the MVP and N to 0.

In step S1002, the motion vector prediction unit 202E3 acquires a set of MVs of vertices around the vertex to be decoded from the motion vector buffer unit 202E2, identifies a vertex for which subsequent processing has not been completed, and transitions to No. In a case where the subsequent processing has been completed for all vertices, the motion vector prediction unit 202E3 transitions to Yes.

In step S1003, the motion vector prediction unit 202E3 transitions to No when the MV of the vertex to be processed has not been decoded, and transitions to Yes if the MV of the vertex to be processed has been decoded.

In step S1004, the motion vector prediction unit 202E3 adds the MV to the MVP and adds 1 to N.

In step S1005, the motion vector prediction unit 202E3 outputs a result obtained by dividing the MVP by N when N is larger than 0, outputs 0 when N is 0, and ends the process.

That is, the motion vector prediction unit 202E3 is configured to output the MVP to be decoded by averaging the decoded motion vectors of the vertices around the vertex to be decoded.

Note that the motion vector prediction unit 202E3 may be configured to set the MVP to 0 in a case where the set of decoded motion vectors is an empty set.

The motion vector calculation unit 202E4 may be configured to calculate the MV of the vertex to be decoded from the MVP output by the motion vector prediction unit 202E3 and the MVR generated by the motion vector residual decoding unit 202E1 according to Expression (1).

$$\mathrm{MV}(k)=\mathrm{MVP}(k)+\mathrm{MVR}(k) \quad (1)$$

Here, k is an index of a vertex. MV, MVR, and MVP are vectors having an x component, a y component, and a z component.

According to such a configuration, since only the MVR is encoded instead of the MV using the MVP, it is possible to expect an effect of increasing the encoding efficiency.

The adder 202E5 is configured to calculate the coordinates of the vertex by adding the MV of the vertex calculated by the motion vector calculation unit 202E4 and the coordinates of the vertex of the reference frame corresponding to the vertex, and keep the connectivity information (Connectivity) as a reference frame.

Specifically, the adder 202E5 may be configured to calculate the coordinate $v'_i(k)$ of the k-th vertex using Expression (2).

$$v'_i(k)=v'_j(k)+\mathrm{MV}(k) \quad (2)$$

Here, $v'_i(k)$ is a coordinate of a k-th vertex to be decoded in the frame to be decoded, $v'_j(k)$ is a coordinate of a decoded k-th vertex of the reference frame, MV(k) is a k-th MV of the frame to be decoded, and k=1, 2, . . . , K.

However, when the arrangement unit 202B2 implements the implementation method 1, the motion vector is decoded with respect to the vertex added in the base mesh of the inter frame to be decoded decoded by the additional vertex calculation unit 202E10.

For example, when k in Expression (2) matches B(k) of the pair of A(k) and B(k) stored in the specific buffer, the adder 202E5 uses Expression (2) for the first motion vector, but uses Expression (3) instead of Expression (2) for the second and subsequent u-th motion vectors.

$$v'_i(A(k))=v'_j(B(k))+\mathrm{MV}^u(B(k)) \quad (3)$$

Further, the connectivity information of the frame to be decoded is made a same as the connectivity information of the reference frame.

Note that, since the motion vector prediction unit 202E3 calculates the MVP using the decoded MV, the decoding order affects the MVP.

The decoding order is the decoding order of the vertices of the base mesh of the reference frame. In general, in the case of a decoding method in which the number of base faces is increased one by one from an edge serving as a starting point using a constant repetition pattern, the order of vertices of the decoded base mesh is determined in the process of decoding.

For example, the motion vector prediction unit 202E3 may determine the decoding order of the vertices using Edgebreaker in the base mesh of the reference frame.

According to such a configuration, since the MV from the reference frame is encoded instead of the coordinates of the vertex, it is possible to expect an effect of increasing the encoding efficiency.

<Subdivision Unit 203>

The subdivision unit 203 is configured to generate and output the added subdivided vertices and their connectivity information from the base mesh decoded by the base mesh decoding unit 202 by the subdivision method indicated by the control information.

Here, the base mesh, the added subdivided vertex, and the connectivity information thereof are collectively referred to as a "subdivided mesh".

The subdivision unit 203 is configured to identify the type of the subdivision method from division_method_id which is control information generated by decoding the base mesh bit stream.

Hereinafter, the subdivision unit 203 will be described with reference to FIGS. 3A and 3B.

Figure 3B:
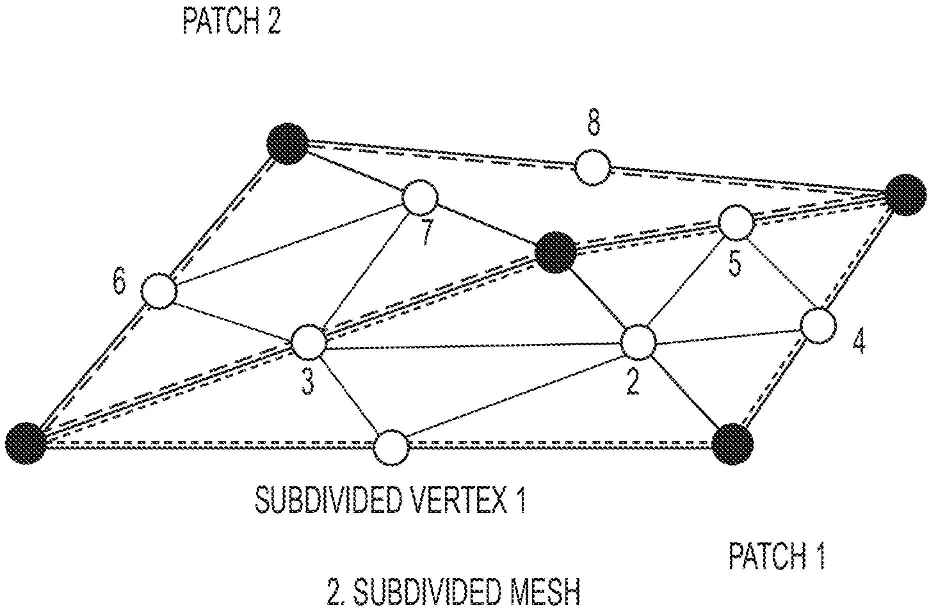
FIG. 3B is a diagram illustrating an example of the base mesh and the subdivided mesh.

FIGS. 3A and 3B are diagrams for describing an example of an operation of generating a subdivided vertex from a base mesh.

FIG. 3A is a diagram illustrating an example of a base mesh including five vertices.

Here, for the subdivision, for example, a mid-edge division method of connecting midpoints of edges in each base face may be used. As a result, a certain base face is divided into four faces.

FIG. 3B illustrates an example of a subdivided mesh obtained by dividing a base mesh including five vertices. In the subdivided mesh illustrated in FIG. 3B, eight subdivided vertices (white circles) are generated in addition to the original five vertices (black circles).

By decoding the displacement by the displacement decoding unit 206 for each subdivided vertex generated in this manner, improvement in encoding performance can be expected.

In addition, a different subdivision method may be applied to each patch. Therefore, the displacement decoded by the displacement decoding unit 206 is adaptively changed in each patch, and the improvement of the encoding performance can be expected. The divided patch information is received as patch id that is control information.

Figure 16:
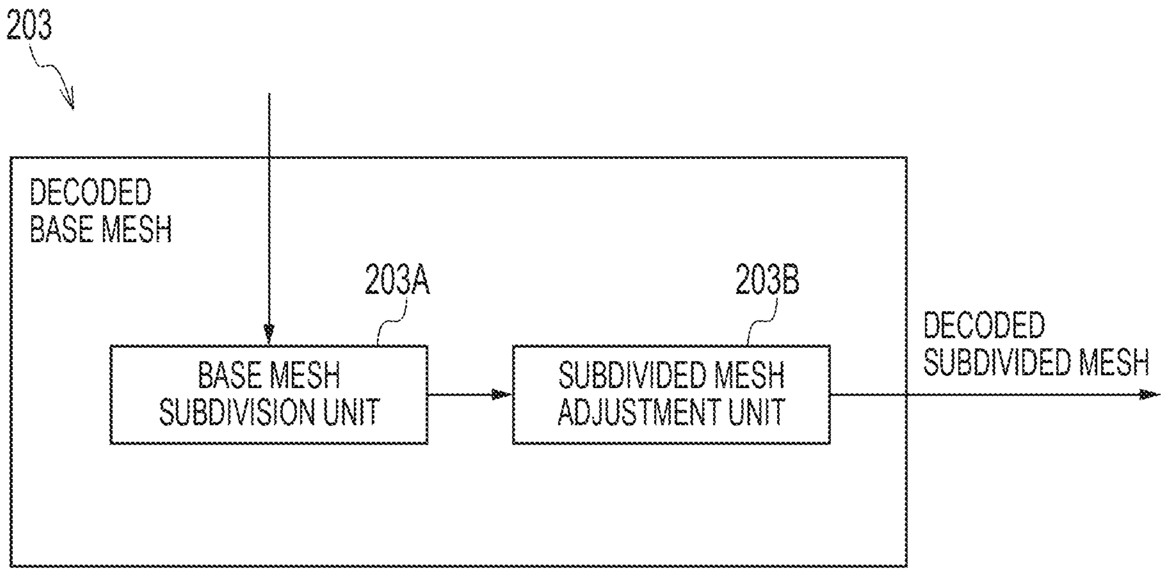
FIG. 16 is a diagram illustrating an example of functional blocks of a subdivision unit 203 of the mesh decoding device 200 according to an embodiment.

Hereinafter, the subdivision unit 203 will be described with reference to FIG. 16. FIG. 16 is a diagram illustrating an example of functional blocks of the subdivision unit 203.

As illustrated in FIG. 16, the subdivision unit 203 includes a base mesh subdivision unit 203A and a subdivided mesh adjustment unit 203B.

(Base Mesh Subdivision Unit 203A)

The base mesh subdivision unit 203A is configured to calculate the number of divisions (the number of subdivisions) for each of the base face and the base patch based on the input base mesh and the division information of the base mesh, subdivide the base mesh based on the number of divisions, and output the subdivided face.

That is, the base mesh subdivision unit 203A may be configured such that the above-described number of divisions can be changed in units of base faces and base patches.

Here, the base face is a face constituting the base mesh, and the base patch is a set of several base faces.

Furthermore, the base mesh subdivision unit 203A may be configured to predict the number of subredivisions of the base face, and calculate the number of subdivisions of the base face by adding a prediction division number residual to the predicted number of subdivisions of the base face.

Furthermore, the base mesh subdivision unit 203A may be configured to calculate the number of subdivisions of the base face based on the number of subdivisions of an adjacent base face of the base face.

Furthermore, the base mesh subdivision unit 203A may be configured to calculate the number of subdivisions of the base face based on the number of subdivisions of the base face accumulated immediately before.

Furthermore, the base mesh subdivision unit 203A may be configured to generate vertices that divide three edges constituting the base face, and subdivide the base face by connecting the generated vertices.

As illustrated in FIG. 16, the subdivided mesh adjustment unit 203B to be described later is provided at a subsequent stage of the base mesh subdivision unit 203A.

Hereinafter, an example of processing of the base mesh subdivision unit 203A will be described with reference to FIGS. 17 to 19.

Figure 17:
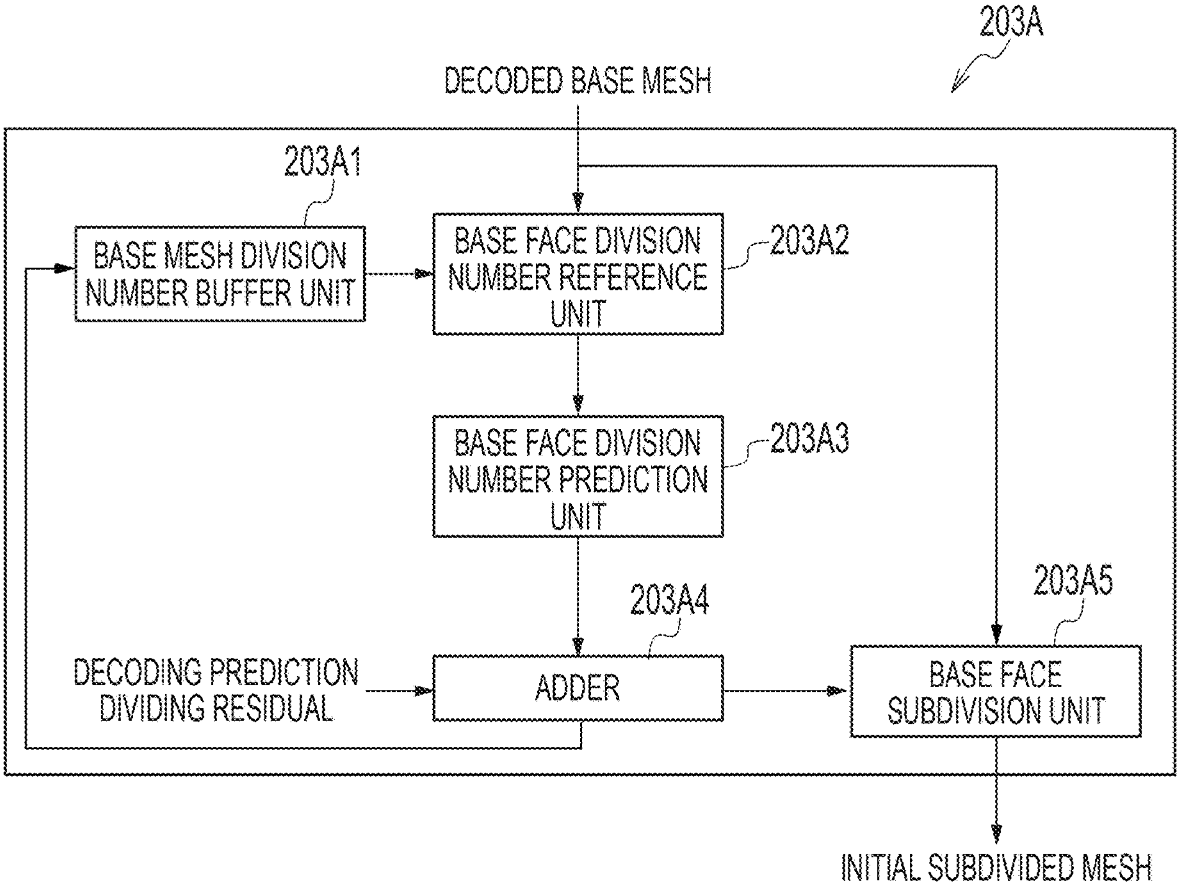
FIG. 17 is a diagram illustrating an example of functional blocks of a base mesh subdivision unit 203A of the subdivision unit 203 of the mesh decoding device 200 according to an embodiment.
Figure 19:
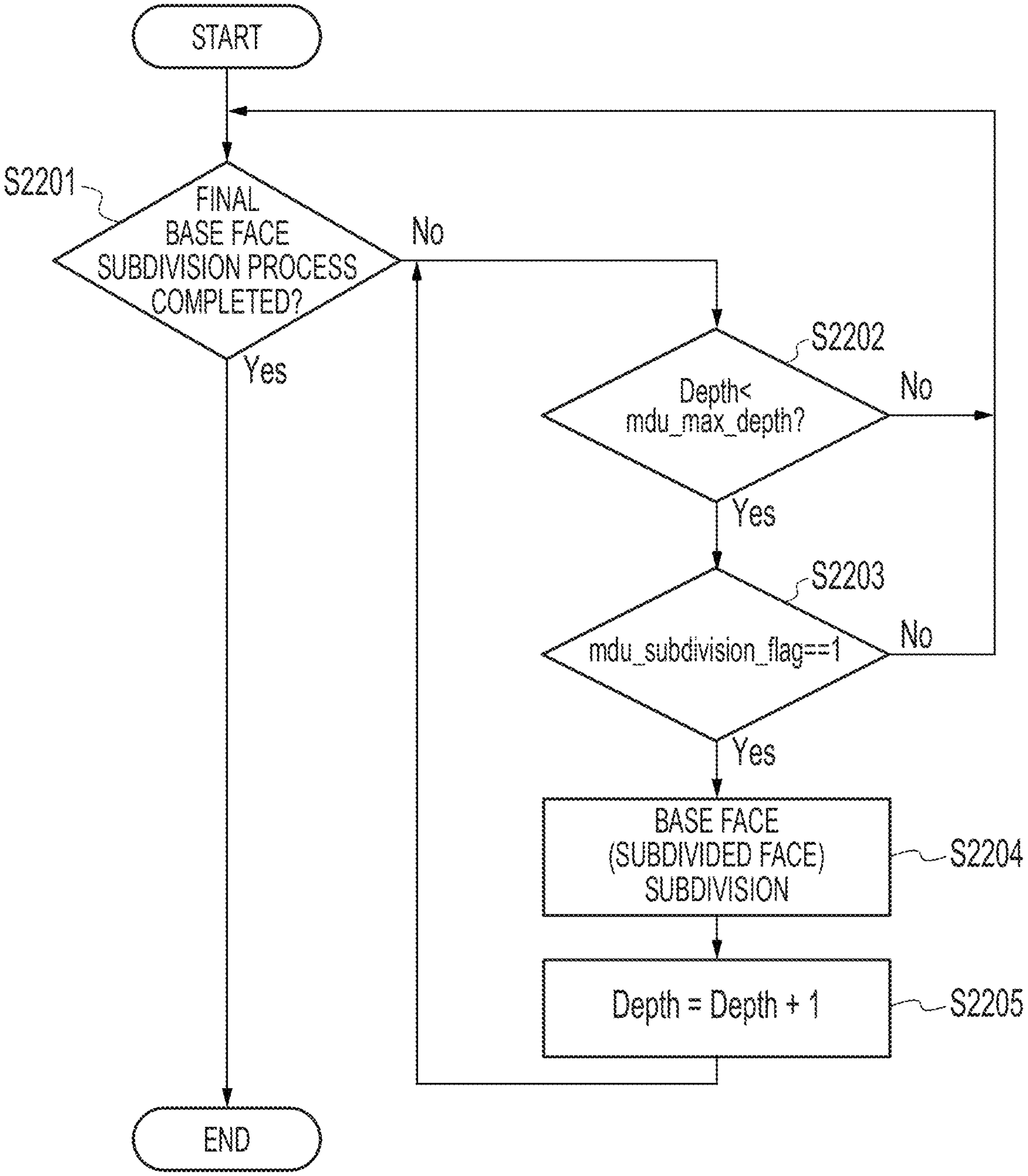
FIG. 19 is a flowchart illustrating an example of an operation of the base mesh subdivision unit 203A of the subdivision unit 203 of the mesh decoding device 200 according to an embodiment.

FIG. 17 is a diagram illustrating an example of functional blocks of the base mesh subdivision unit 203A, and FIG. 19 is a flowchart illustrating an example of operation of the base mesh subdivision unit 203A.

As illustrated in FIG. 17, the base mesh subdivision unit 203A includes a base face division number buffer unit 203A1, a base face division number reference unit 203A2, a base face division number prediction unit 203A3, an addition unit 203A4, and a base face division unit 203A5.

The base face division number buffer unit 203A1 stores division information of the base face including the number of divisions of the base face, and is configured to output the division information of the base face to the base face division number reference unit 203A2.

Here, the size of the base face division number buffer unit 203A1 may be set to 1, and the number of divisions of the base face accumulated immediately before may be output to the base face division number reference unit 203A2.

That is, by setting the size of the base face division number buffer unit 203A1 to 1, only the number of last decoded subdivisions (the number of subdivisions decoded immediately before) may be referred to.

In a case where the base face adjacent to the base face to be decoded does not exist, or in a case where the base face adjacent to the base face to be decoded exists but the number of divisions is not fixed, the base face division number reference unit 203A2 is configured to output "reference impossible" to the base face division number prediction unit 203A3.

On the other hand, the base face division number reference unit 203A2 is configured to output the number of divisions to the base face division number prediction unit 203A3 in a case where the base face adjacent to the base face to be decoded exists and the number of divisions is determined.

The base face division number prediction unit 203A3 is configured to predict the number of divisions (the number of subdivisions) of the base face based on the one or more input numbers of division, and output the predicted number of division (prediction division number) to the addition unit 203A4.

Here, the base face division number prediction unit 203A3 is configured to output 0 to the addition unit 203A4 in a case where only "reference impossible" is input from the base face division number reference unit 203A2.

Note that, in a case where one or more numbers of division are input, the base face division number prediction unit 203A3 may be configured to generate the prediction division number by using any of statistical values such as an average value, a maximum value, a minimum value, and a mode value of the input number of divisions.

Note that the base face division number prediction unit 203A3 may be configured to generate the number of divisions of the most adjacent face as the prediction division number when one or more numbers of divisions are input.

The addition unit 203A4 is configured to output the number of divisions obtained by adding the prediction division number residual decoded from the prediction residual bit stream and the prediction division number acquired from the base face division number prediction unit 203A3 to the base face division unit 203A5.

The base face division unit 203A5 is configured to subdivide the base face based on the input number of divisions from the addition unit 203A4.

Figure 18:
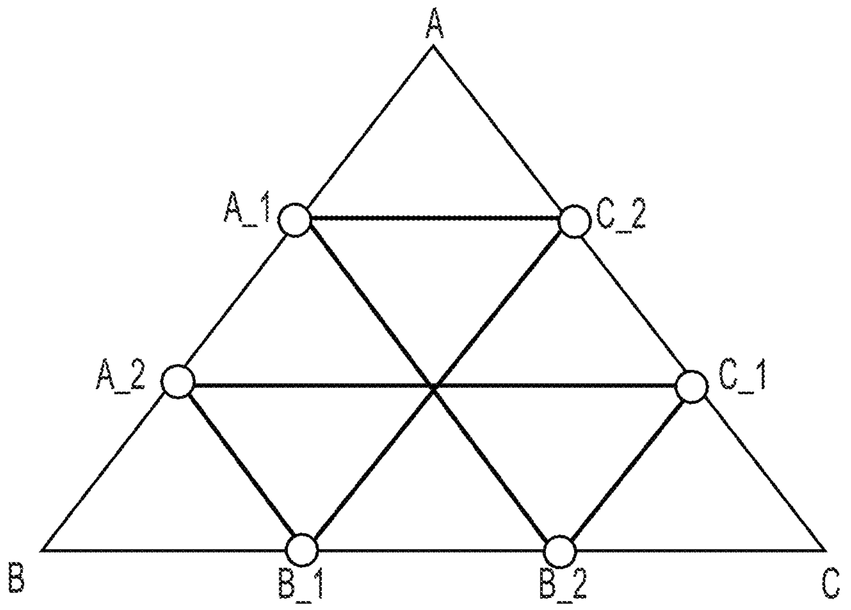
FIG. 18 is a diagram for describing an example of a method of dividing a base face by a base face division unit 203A5 of the base mesh subdivision unit 203A of the subdivision unit 203 of the mesh decoding device 200 according to an embodiment.

FIG. 18 illustrates an example of a case where the base face is divided into nine. A method of dividing the base face by the base face division unit 203A5 will be described with reference to FIG. 18.

The base face division unit 203A5 generates points A_1, . . . , A_(N−1) equally dividing the edge AB constituting the base face into N (N=3).

Similarly, the base face division unit 203A5 equally divides the edge BC and the edge CA into N to generate points B_1, . . . , B_(N−1), C_1, . . . , C_(N−1), respectively.

Hereinafter, points on the edge AB, the edge BC, and the edge CA are referred to as "edge division points".

The base face division unit 203A5 generates edges A_i B_(N−i), B_i C_(N−i), and C_i A_(N−i) for all i (i=1, 2, . . . , N−1) to generate $N^2$ subdivided faces.

Next, a processing procedure of the base mesh subdivision unit 203A will be described with reference to FIG. 19.

In step S2201, it is determined whether the redivision process has been completed for the last base face. In a case where the processing is completed, the process ends, and when not, the process proceeds to step S2202.

In step S2202, the base mesh subdivision unit 203A determines Depth<mdu_max_depth.

Here, Depth is a variable representing the current depth, the initial value is 0, and mdu_max_depth represents the maximum depth determined for each base face.

In a case where the condition in step S2202 is satisfied, the processing procedure proceeds to step S2203, and in a case where the condition is not satisfied, the processing procedure returns the process to step S2201.

In step S2203, the base mesh subdivision unit 203A determines whether mdu_division_flag at the current depth is 1.

In the case of Yes, the processing procedure proceeds to step S2201, and in the case of No, the processing procedure proceeds to step S2204.

In step S2204, the base mesh subdivision unit 203A further subdivides all the subdivided faces in the base face.

Here, the base mesh subdivision unit 203A subdivides the base face in a case where the subdivision processing has never been performed on the base face.

Note that the method of subdivision is similar to the method described in step S2204.

Specifically, in a case where the base face has never been subdivided, the base face is subdivided as illustrated in FIG. 18. In a case where subdivision has been performed at least once, the subdivided face is subdivided into $N^2$. In the example of FIG. 18, the face including the vertex A_2, the vertex B, and the vertex B_1 is further divided by a same method as in the division of the base face to generate $N^2$ faces.

When the subdivision processing ends, the processing procedure proceeds to step S2205.

In step S2205, the base mesh subdivision unit 203A adds 1 to Depth, and the present processing procedure returns the process to step S2202.

(Subdivided Mesh Adjustment Unit 203B)

Next, a specific example of processing performed by the subdivided mesh adjustment unit 203B will be described. Hereinafter, an example of processing performed by the subdivided mesh adjustment unit 203B will be described with reference to FIGS. 20 to 24.

Figure 20:
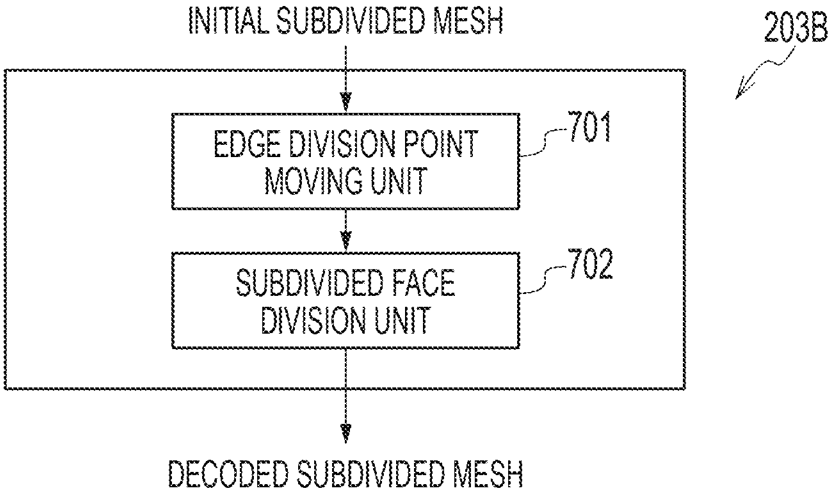
FIG. 20 is a diagram illustrating an example of functional blocks of a subdivided mesh adjustment unit 203B of the subdivision unit 203 of the mesh decoding device 200 according to an embodiment.

FIG. 20 is a diagram illustrating an example of functional blocks of the subdivided mesh adjustment unit 203B.

As illustrated in FIG. 20, the subdivided mesh adjustment unit 203B includes an edge division point moving unit 701 and a subdivided face division unit 702.

(Edge Division Point Moving Unit 701)

The edge division point moving unit 701 is configured to move the edge division point of the base face to any of the edge division points of the adjacent base faces with respect to the input initial subdivided face, and output the subdivided face.

Figure 21:
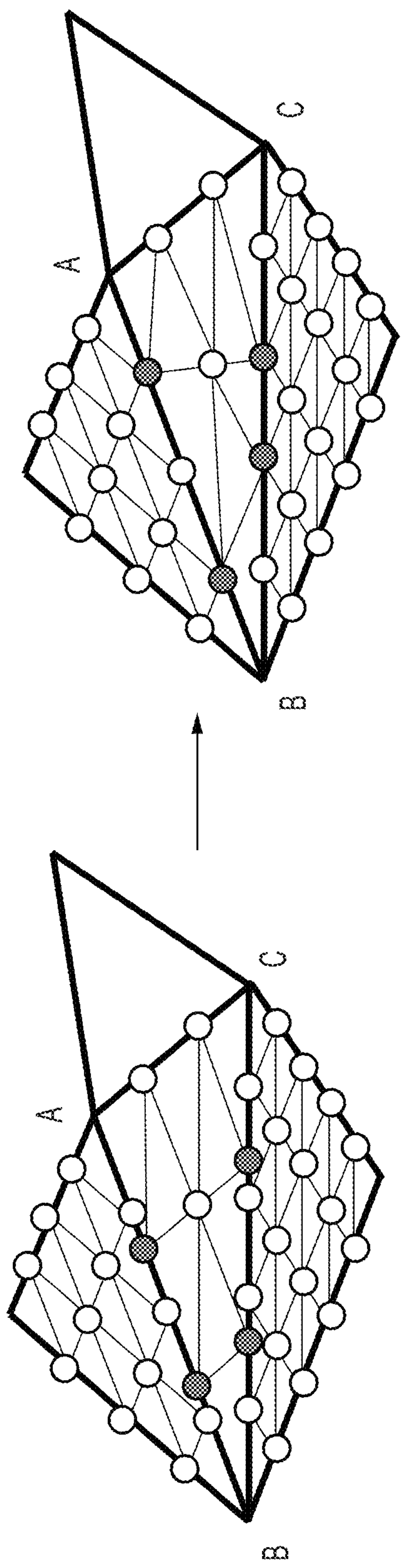
FIG. 21 is a diagram illustrating an example of a case where an edge division point on a base face ABC is moved by an edge division point moving unit 701 of the subdivided mesh adjustment unit 203B of the subdivision unit 203 of the mesh decoding device 200 according to an embodiment.

FIG. 21 illustrates an example in which the edge division point on a base face ABC is moved. For example, as illustrated in FIG. 21, the edge division point moving unit 701 may be configured to move the edge division point of the base face ABC to the edge division point of the closest adjacent base face.

(Subdivided Face Division Unit 702)

The subdivided face division unit 702 is configured to subdivide the input subdivided face again to output the decoding subdivided face.

Figure 22:
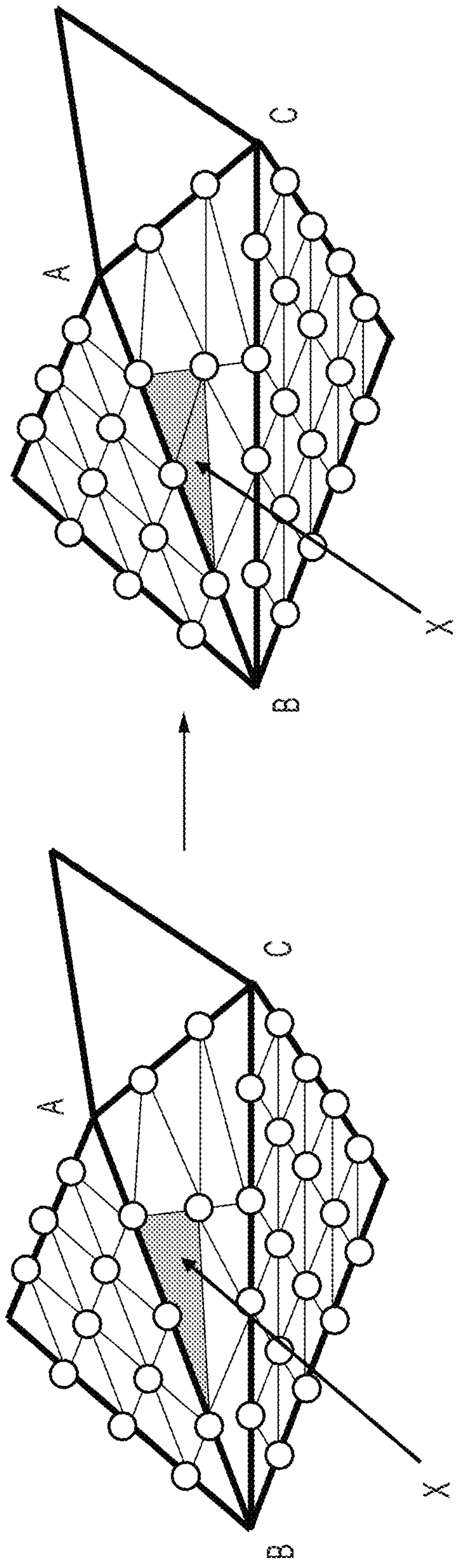
FIG. 22 is a diagram illustrating an example of a case where a subdivided face X in the base face is subdivided again by a subdivided face division unit 702 of the subdivided mesh adjustment unit 203B of the subdivision unit 203 of the mesh decoding device 200 according to an embodiment.

FIG. 22 is a diagram illustrating an example of a case where a subdivided face X in the base face is subdivided again.

As illustrated in FIG. 22, the subdivided face division unit 702 may be configured to generate a new subdivided face in the base face by connecting a vertex constituting the subdivided face and an edge division point of the adjacent base face.

Figure 23:
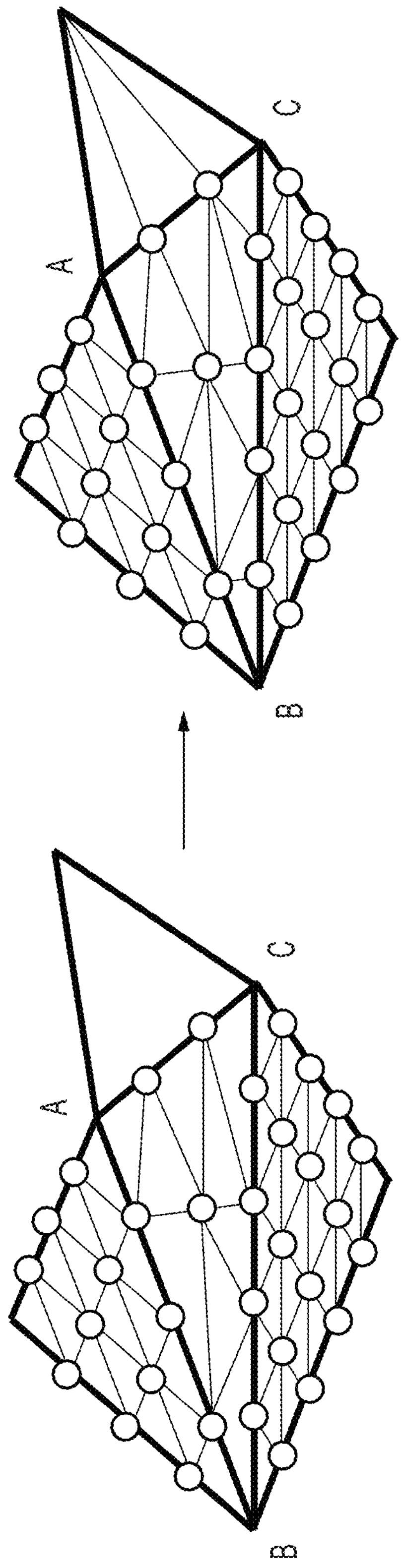
FIG. 23 is a diagram illustrating an example of a case where all the subdivided faces are subdivided again by the subdivided face division unit 702 of the subdivided mesh adjustment unit 203B of the subdivision unit 203 of the mesh decoding device 200 according to an embodiment.

FIG. 23 is a diagram illustrating an example of a case where the above-described subdivision processing is performed on all the subdivided faces.

The mesh decoding unit 204 is configured to generate and output a decoded mesh using the subdivided mesh generated by the subdivision unit 203 and the displacement decoded by the displacement decoding unit 206.

Specifically, the mesh decoding unit 204 is configured to generate a decoded mesh by adding a corresponding displacement to each subdivided vertex. Here, information to which subdivided vertex each displacement corresponds is indicated by the control information.

The patch integration unit 205 is configured to integrate to output the plurality of patches of the decoded mesh generated by the mesh decoding unit 204.

Here, a patch division method is defined by the mesh encoding device 100. For example, the patch division method may be configured such that a normal vector is calculated for each base face, a base face having the most similar normal vector among adjacent base faces is selected, both base faces are grouped as a same patch, and such a procedure is sequentially repeated for the next base face.

The video decoding unit 207 is configured to decode and output texture by video coding. For example, the video decoding unit 207 may use HEVC described in Non Patent Literature 1.

<Displacement Decoding Unit 206>

The displacement decoding unit 206 is configured to decode a displacement bit stream to generate and output a displacement.

FIG. 3B is a diagram illustrating an example of a displacement with respect to a certain subdivided vertex. In the example of FIG. 3B, since there are eight subdivided vertices, the displacement decoding unit 206 is configured to define eight displacements expressed by scalars or vectors for each subdivided vertex.

Figure 24:
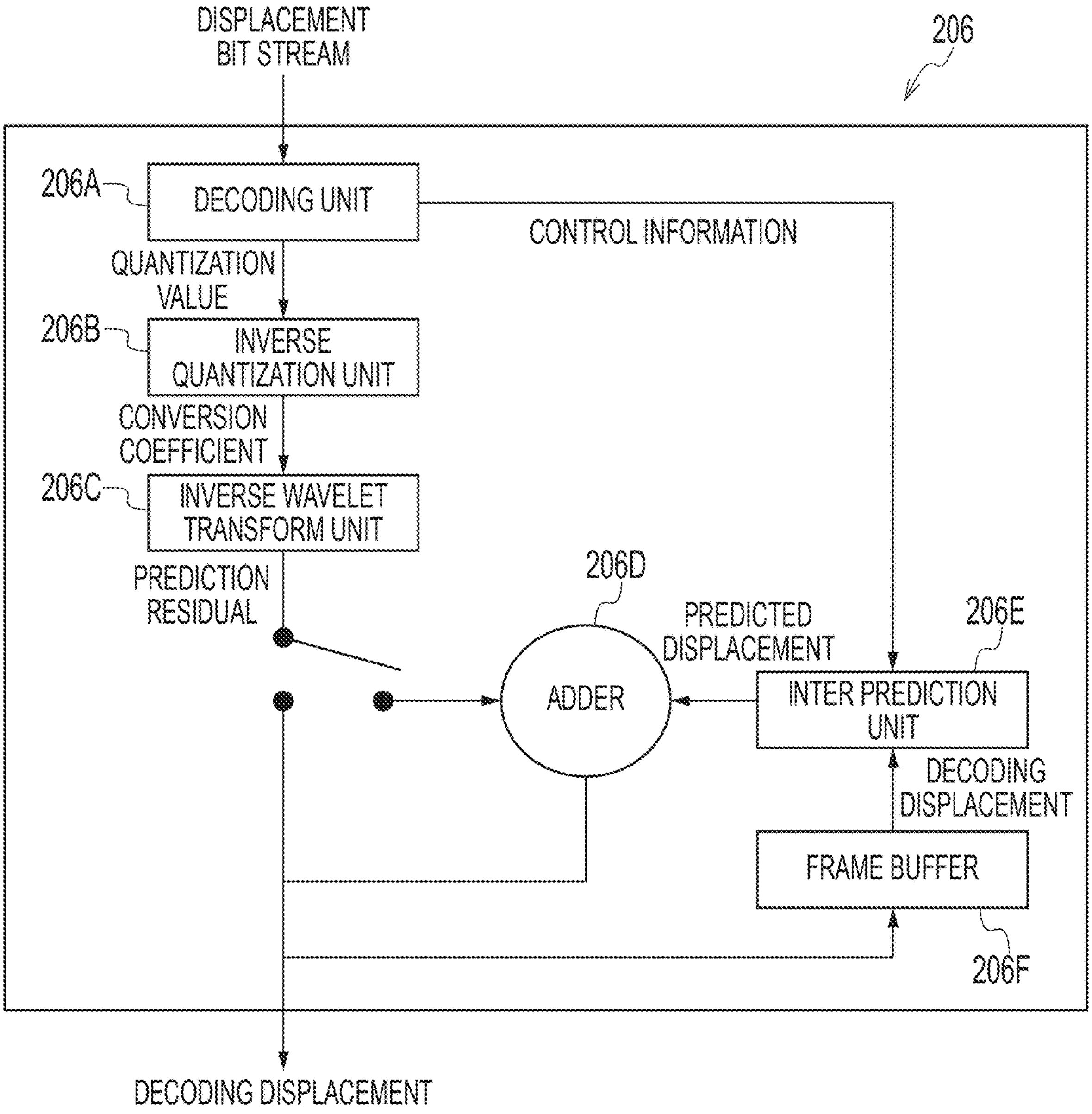
FIG. 24 is a diagram illustrating an example of functional blocks of a displacement decoding unit 206 of the mesh decoding device 200 according to an embodiment (in a case where inter-prediction is performed in a spatial domain).

The displacement decoding unit 206 will be described below with reference to FIG. 24. FIG. 24 is a diagram illustrating an example of functional blocks of the displacement decoding unit 206.

As illustrated in FIG. 24, the displacement decoding unit 206 includes a decoding unit 206A, an inverse quantization unit 206B, an inverse wavelet transform unit 206C, an adder 206D, an inter prediction unit 206E, and a frame buffer 206F.

The decoding unit 206A is configured to decode and output the level value and the control information by performing variable-length decoding on the received displacement bit stream. Here, the level value obtained by the variable-length decoding is output to the inverse quantization unit 206B, and the control information is output to the inter prediction unit 206E.

Figure 25:
FIG. 25 is a diagram illustrating an example of a configuration of a displacement bit stream.

Hereinafter, an example of a configuration of a displacement bit stream will be described with reference to FIG. 25. FIG. 25 is a diagram illustrating an example of a configuration of a displacement bit stream.

As illustrated in FIG. 25, first, the displacement bit stream may include a displacement parameter set (DPS) which is a set of control information related to decoding of the displacement.

Second, the displacement bit stream may include a displacement patch header (DPH) that is a set of control information corresponding to the patch.

Third, the displacement bit stream may contain the encoded displacement which, next to the DPH, constitutes a patch.

As described above, the displacement bit stream has a configuration in which the DPH and the DPS correspond to each encoded displacement one by one.

Note that the configuration in FIG. 25 is merely an example. When the DPH and the DPS are configured to correspond to each encoded displacement, elements other than the above may be added as constituent elements of the displacement bit stream.

For example, as illustrated in FIG. 25, the displacement bit stream may include a sequence parameter set (SPS).

FIG. 26 is a diagram illustrating an example of a syntax configuration of a DPS.

Note that the Descriptor column in FIG. 26 indicates how each syntax is encoded.

Further, in FIG. 26, ue(v) means an unsigned 0-order exponential-Golomb code, and u(n) means a n-bit flag.

In a case where there is a plurality of DPSs, the DPS includes at least DPS id information (dps_displacement_parameter_set_id) for identifying each DPS.

Further, the DPS may include a flag (interprediction_enabled_flag) that controls whether to perform inter-prediction.

For example, when interprediction_enabled_flag is 0, it may be defined that inter-prediction is not performed, and when interprediction_enabled_flag is 1, it may be defined that inter-prediction is performed. When interprediction_enabled_flag is not included, it may be defined that inter-prediction is not performed.

The DPS may include a flag (dct_enabled_flag) that controls whether to perform the inverse DCT.

For example, when dct_enabled_flag is 0, it may be defined that the inverse DCT is not performed, and when dct_enabled_flag is 1, it may be defined that the inverse DCT is performed. When dct_enabled_flag is not included, it may be defined that the inverse DCT is not performed.

FIG. 27 is a diagram illustrating an example of a syntax configuration of the DPH.

As illustrated in FIG. 27, the DPH includes at least DPS id information for designating a DPS corresponding to each DPH.

The inverse quantization unit 206B is configured to generate and output a transform coefficient by inversely quantizing the level value decoded by the decoding unit 206A.

The inverse wavelet transform unit 206C is configured to generate and output a prediction residual by applying an inverse wavelet transform to the transform coefficient generated by the inverse quantization unit 206B.

(Inter Prediction Unit 206E)

The inter prediction unit 206E is configured to generate and output a predicted displacement by performing inter-prediction using the decoded displacement of the reference frame read from the frame buffer 206F.

The inter prediction unit 206E is configured to perform such inter-prediction only in a case where interprediction_enabled_flag is 1.

The inter prediction unit 206E may perform inter-prediction in the spatial domain or may perform inter-prediction in the frequency domain. In the inter-prediction, bidirectional prediction may be performed using a past reference frame and a future reference frame in terms of time.

FIG. 24 is an example of functional blocks of the inter prediction unit 206E in a case where inter-prediction is performed in the spatial domain.

In a case where inter-prediction is performed in the spatial domain, the inter prediction unit 206E may determine the predicted displacement of the subdivided vertex in the target frame with reference to the decoded displacement of the corresponding subdivided vertex in the reference frame as it is.

Alternatively, the predicted displacement of a certain subdivided vertex in the target frame may be probabilistically determined according to the normal distribution in which the average and the variance are estimated using the decoded displacements of the corresponding subdivided vertices in the plurality of reference frames. In this case, the variance may be uniquely determined only by the average as zero.

Alternatively, the predicted displacement of a certain subdivided vertex in the target frame may be determined based on a regression curve in which the time is estimated as an explanatory variable and the displacement is estimated as an objective variable using the decoded displacements of the corresponding subdivided vertices in the plurality of reference frames.

In the mesh encoding device 100, the order of the decoded displacements may be rearranged for each frame in order to improve the encoding efficiency.

In such a case, the inter prediction unit 206E may be configured to perform inter-prediction on the rearranged decoded displacement.

A correspondence of subdivided vertices between the reference frame and the frame to be decoded is indicated by the control information.

Figure 28:
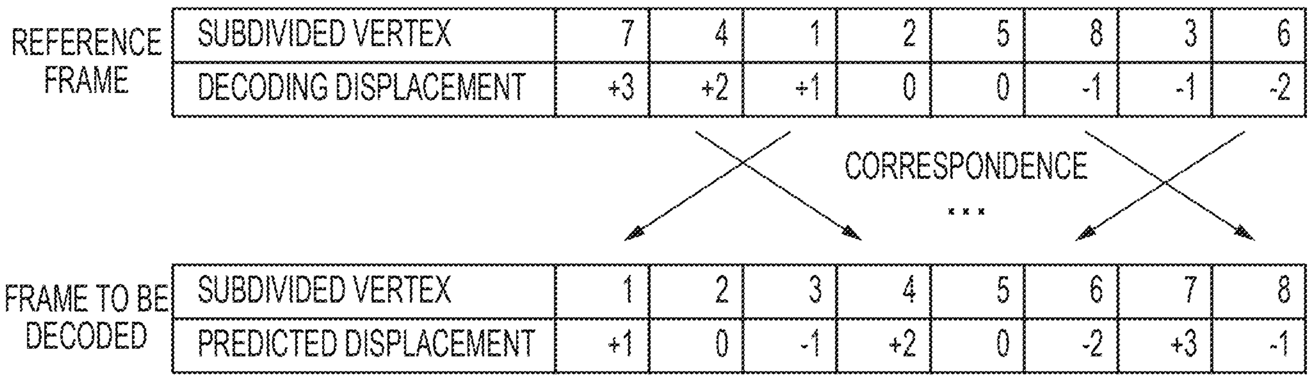
FIG. 28 is a diagram for describing an example of a correspondence of subdivided vertices between a reference frame and a frame to be decoded in a case where inter-prediction is performed in a spatial domain.

FIG. 28 is a diagram for describing an example of a correspondence of subdivided vertices between a reference frame and a frame to be decoded in a case where inter-prediction is performed in a spatial domain.

Figure 29:
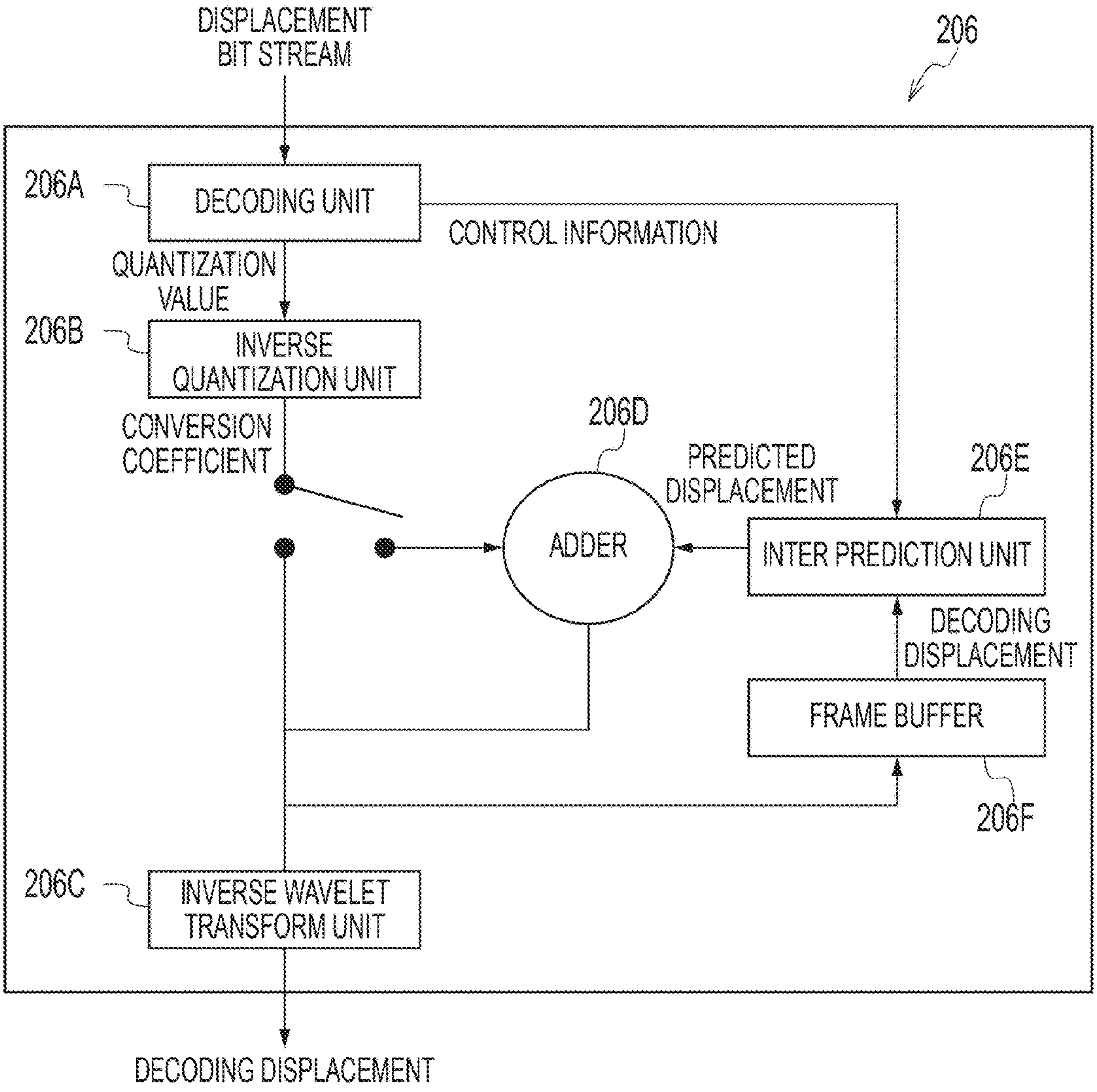
FIG. 29 is a diagram illustrating an example of functional blocks of a displacement decoding unit 206 of the mesh decoding device 200 according to an embodiment (in a case where inter-prediction is performed in a frequency domain).

FIG. 29 is an example of functional blocks of the inter prediction unit 206E in a case where inter-prediction is performed in the frequency domain.

In a case where inter-prediction is performed in the frequency domain, the inter prediction unit 206E may determine the predicted wavelet transform coefficient of the frequency in the frame to be decoded with reference to the decoded wavelet transform coefficient of the corresponding frequency in the reference frame as it is.

The inter prediction unit 206E may probabilistically perform inter-prediction according to a normal distribution in which the average and the variance are estimated using the decoded displacements or decoded wavelet transform coefficients of the subdivided vertices in the plurality of reference frames.

The inter prediction unit 206E may perform inter-prediction based on a regression curve in which time is estimated as an explanatory variable and a displacement is estimated as an objective variable, using a decoded displacement or a decoded wavelet transform coefficient of the subdivided vertices in a plurality of reference frames.

The inter prediction unit 206E may be configured to bidirectionally perform inter-prediction using a past reference frame and a future reference frame in terms of time.

In the mesh encoding device 100, the order of the decoding wavelet transform coefficients may be rearranged for each frame in order to improve the encoding efficiency.

A correspondence of frequencies between the reference frame and the frame to be decoded is indicated by the control information.

Figure 30:
FIG. 30 is a diagram for describing an example of a correspondence of frequencies between a reference frame and a frame to be decoded in a case where inter-prediction is performed in a frequency domain.

FIG. 30 is a diagram for describing an example of a correspondence of frequencies between a reference frame and a frame to be decoded in a case where inter-prediction is performed in a frequency domain.

In a case where the subdivision unit 203 divides the base mesh into a plurality of patches, the inter prediction unit 206E is also configured to perform inter-prediction for each divided patch. As a result, the time correlation between frames is increased, and improvement in encoding performance can be expected.

The adder 206D receives the prediction residual from the inverse wavelet transform unit 206C, and receives the predicted displacement from the inter prediction unit 206E.

The adder 206D is configured to calculate to output the decoded displacement by adding the prediction residual and the predicted displacement.

The decoded displacement calculated by the adder 206D is also output to the frame buffer 206F.

The frame buffer 206F is configured to acquire and accumulate the decoded displacement from the adder 206D.

Here, the frame buffer 206F outputs the decoded displacement at the corresponding vertex in the reference frame according to control information (not illustrated).

Figure 31:
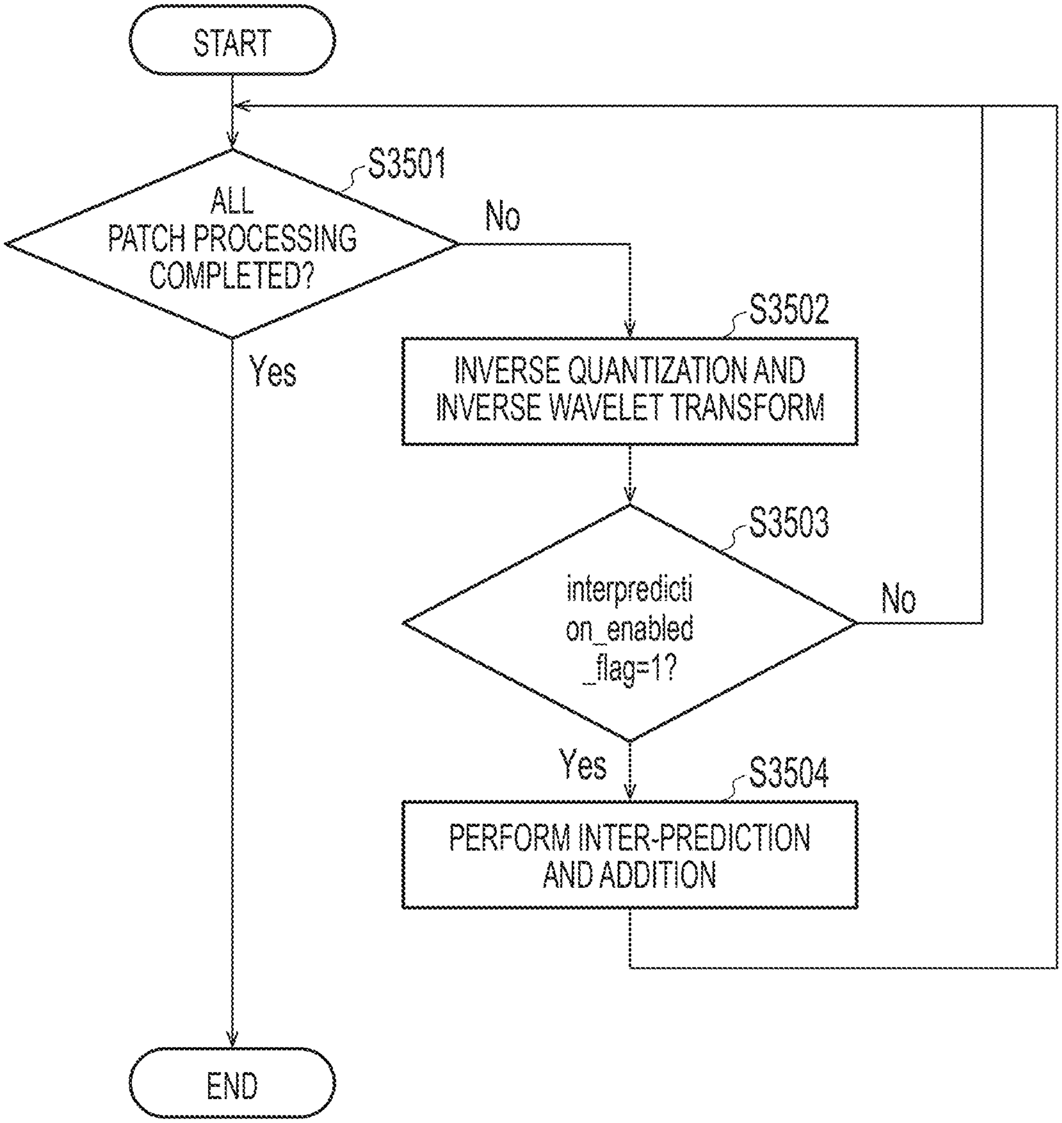
FIG. 31 is a flowchart illustrating an example of an operation of the displacement decoding unit 206 of the mesh decoding device 200 according to an embodiment.

FIG. 31 is a flowchart illustrating an example of an operation of the displacement decoding unit 206.

As illustrated in FIG. 31, in step S3501, the displacement decoding unit 206 determines whether the present processing is completed for all the patches.

In the case of Yes, the present operation ends, and in the case of No, the present operation proceeds to step S3502.

In step S3502, the displacement decoding unit 206 performs inverse DCT and then performs inverse quantization and inverse wavelet transform on the patch to be decoded.

In step S3503, the displacement decoding unit 206 determines whether interprediction_enabled_flag is 1.

In the case of Yes, the present operation proceeds to step S3504, and in the case of No, the present operation proceeds to step S3501.

In step S3504, the displacement decoding unit 206 performs the above inter-prediction and addition.

<Modification 1>

Hereinafter, with reference to FIG. 32, the modification 1 of the above-described modification 1 will be described focusing on differences from the modification 1 described above.

Figure 32:
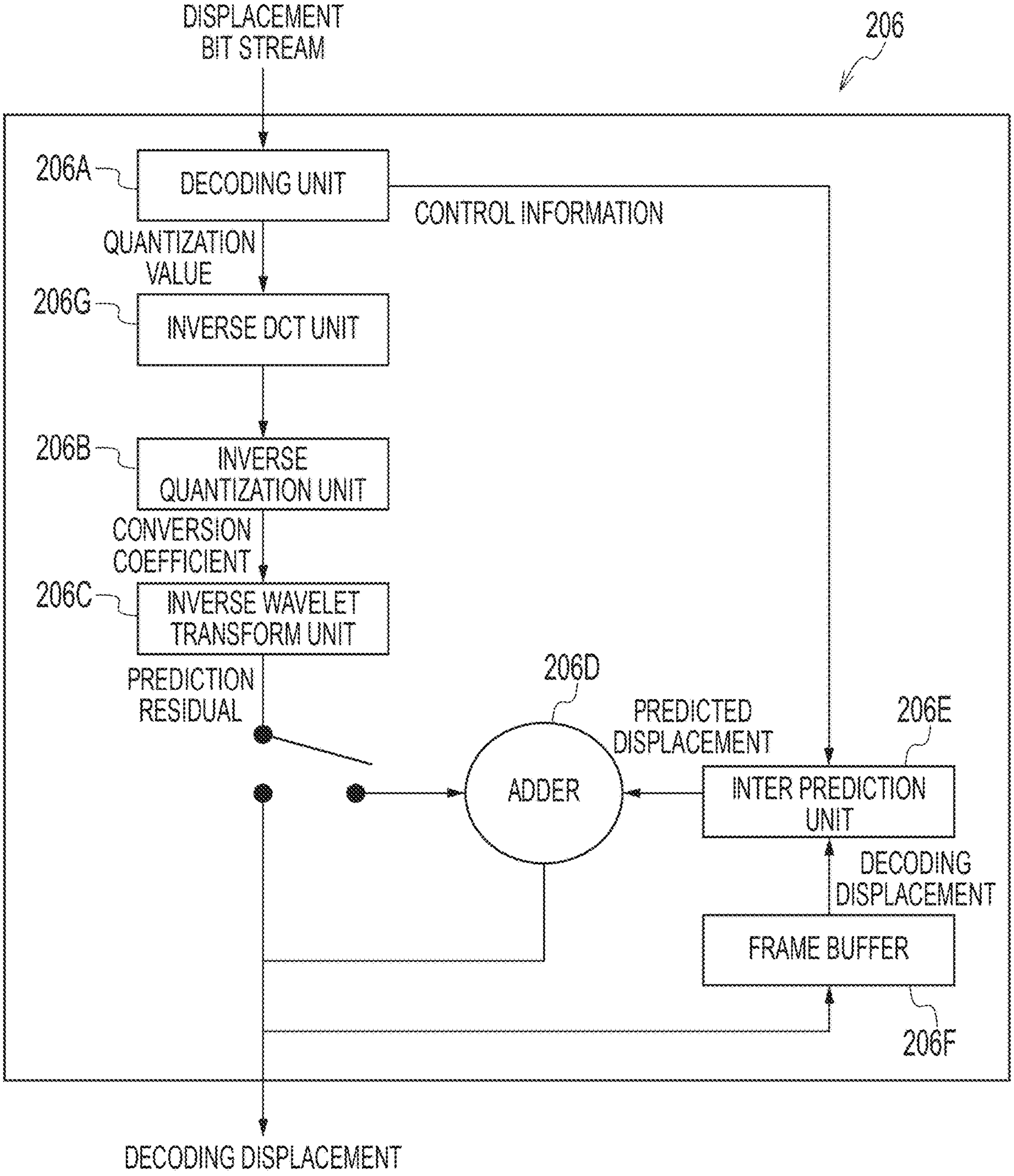
FIG. 32 is a diagram illustrating an example of functional blocks of a displacement decoding unit 206 according to the modification 1.

FIG. 32 is a diagram illustrating an example of functional blocks of the displacement decoding unit 206 according to the present modification 1.

As illustrated in FIG. 32, the displacement decoding unit 206 according to the present modification 1 includes an inverse DCT unit 206G at a subsequent stage of the decoding unit 206A, that is, between the decoding unit 206A and the inverse quantization unit 206B.

That is, in the present modification 1, the inverse quantization unit 206B is configured to generate the prediction residual by applying the inverse wavelet transform to the level value output from the inverse DCT unit 202G.

<Modification 2>

Hereinafter, with reference to FIG. 33, the modification 2 of the above-described first embodiment will be described focusing on differences from the first embodiment described above.

Figure 33:
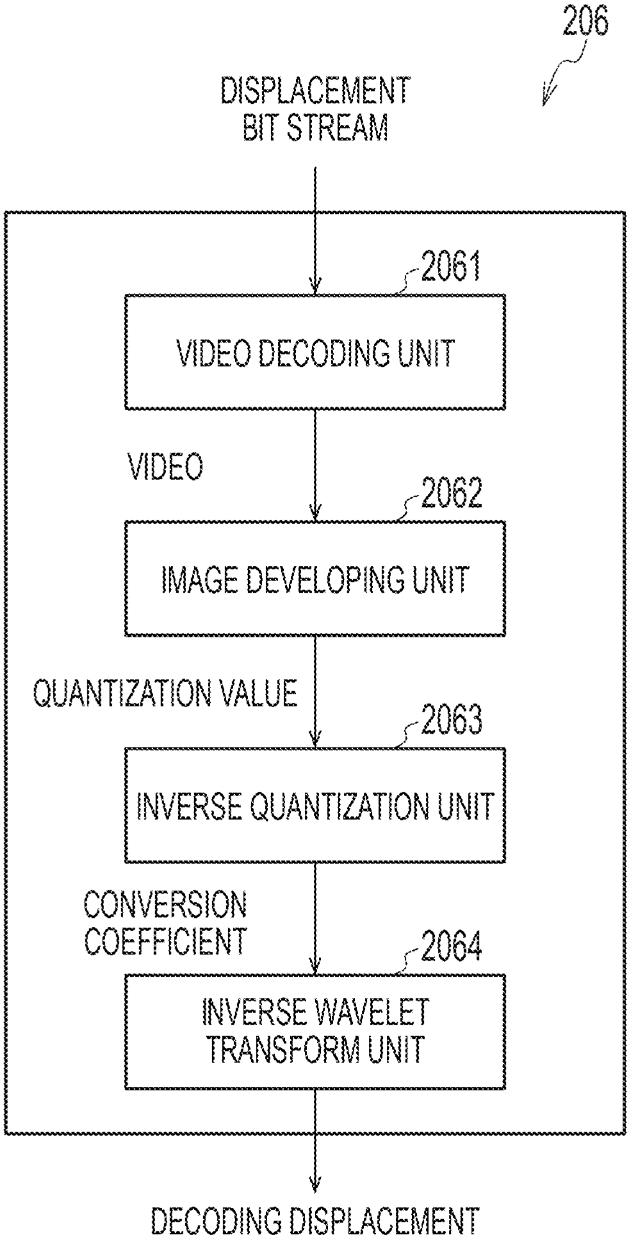
FIG. 33 is a diagram illustrating an example of functional blocks of a displacement decoding unit 206 according to the modification 2.

As illustrated in FIG. 33, the displacement decoding unit 206 according to the present modification 2 includes a video decoding unit 2061, an image unpacking unit 2062, an inverse quantization unit 2063, and an inverse wavelet transform unit 2064.

The video decoding unit 2061 is configured to output a video by decoding the received displacement bit stream by video coding.

For example, the video decoding unit 2061 may use HEVC described in Non Patent Literature 1.

Further, the video decoding unit 2061 may use a video coding scheme in which the motion vector is always 0. For example, the video decoding unit 2061 may set the motion vector of HEVC to 0 at all times, and may constantly use inter-prediction at a same position.

Further, the video decoding unit 2061 may use a video coding scheme in which conversion is always skipped. For example, the video decoding unit 2061 may constantly set the conversion of HEVC to the conversion skip mode, and may use the video coding scheme without performing the conversion.

The image unpacking unit 2062 is configured to unpack to output the video decoded by the video decoding unit 2061 as a level value for each image (frame).

In the unpacking method, the image unpacking unit 2062 can identify the level value by reverse calculation from the arrangement of the level values in the image indicated by the control information.

For example, the image unpacking unit 2062 may arrange the level values from the high frequency component to the low frequency component in the order of raster operation in the image as the arrangement of the level values.

The inverse quantization unit 2063 is configured to generate and output a transform coefficient by inversely quantizing the level value generated by the image unpacking unit 2062.

The inverse wavelet transform unit 2064 is configured to generate and output a decoded displacement by applying an inverse wavelet transform to the transform coefficient generated by the inverse quantization unit 2063.

The mesh encoding device 100 and the mesh decoding device 200 described above may be implemented as programs that cause a computer to execute each function (each step).

According to the present embodiment, for example, comprehensive improvement in service quality can be realized in moving image communication, and thus, it is possible to contribute to the goal 9 "Build resilient infrastructure, promote inclusive and sustainable industrialization and foster innovation" of the sustainable development goal (SDGs) established by the United Nations.

The invention claimed is:

1. A mesh decoding device comprising:

a circuit that collectively sets duplicate vertices that are a plurality of vertices having identical coordinates in a decoded base mesh as a single vertex, and then rearranges vertices of the base mesh, wherein the circuit calculates an index or coordinates of a vertex to be increased in a base mesh of an inter frame to be decoded by a vertex of a base mesh of a reference frame having a plurality of motion vectors.

2. The mesh decoding device according to claim 1, wherein the circuit decodes a list of the duplicate vertices from a bit stream of an I frame.

3. The mesh decoding device according to claim 1, wherein the circuit calculates a list of the duplicate vertices by searching for the duplicate vertices from the base mesh.

4. The mesh decoding device according to claim 1, wherein after determining a list of the duplicate vertices, the circuit integrates all or some of the duplicate vertices to update Connectivity.

5. The mesh decoding device according to claim 4, wherein after determining a list of the duplicate vertices, the circuit decodes information about duplicate vertices not to be processed from a bit stream, and integrates duplicate vertices other than the duplicate vertices not to be processed to update Connectivity.

6. The mesh decoding device according to claim 1, wherein when integrating all duplicate vertices, the circuit decodes, from a bit stream, an index of a vertex to be increased in a base mesh of an inter frame to be decoded by a vertex of a base mesh of a reference frame having a plurality of motion vectors.

7. The mesh decoding device according to claim 1, wherein when integrating all duplicate vertices, the circuit decodes a motion vector with respect to an additional vertex of a base mesh of a decoded inter frame to be decoded.

8. A mesh decoding method comprising:

collectively setting duplicate vertices that are a plurality of vertices having identical coordinates in a decoded base mesh as a single vertex, and then rearranging vertices of the base mesh; and calculating an index or coordinates of a vertex to be increased in a base mesh of an inter frame to be decoded by a vertex of a base mesh of a reference frame having a plurality of motion vectors.

9. A non-transitory computer-readable storage medium having a program stored thereon which is executable by a computer to function as a mesh decoding device, wherein the mesh decoding device includes a circuit that collectively sets duplicate vertices that are a plurality of vertices having identical coordinates in a decoded base mesh as a single vertex, and then rearranges vertices of the base mesh, wherein the circuit calculates an index or coordinates of a vertex to be increased in a base mesh of an inter frame to be decoded by a vertex of a base mesh of a reference frame having a plurality of motion vectors.

* * * * *